United States Patent
Meredith et al.

(10) Patent No.: US 11,563,670 B2
(45) Date of Patent: *Jan. 24, 2023

(54) METHODS, DEVICES AND SYSTEMS FOR DETERMINING A TARGET PATH

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Zachary Meredith, Roswell, GA (US); Prashant Shivaji Bhapkar, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/228,017

(22) Filed: Apr. 12, 2021

(65) Prior Publication Data
US 2021/0234789 A1    Jul. 29, 2021

Related U.S. Application Data

(63) Continuation-in-part of application No. 16/998,813, filed on Aug. 20, 2020, now Pat. No. 11,218,403,
(Continued)

(51) Int. Cl.
*H04L 45/12* (2022.01)
*H04L 45/122* (2022.01)
(Continued)

(52) U.S. Cl.
CPC ......... *H04L 45/122* (2013.01); *G06Q 10/047* (2013.01); *H04L 45/123* (2013.01);
(Continued)

(58) Field of Classification Search
CPC ......... H04L 45/00; H04L 45/02; H04L 45/04; H04L 45/12; H04L 45/122–125;
(Continued)

(56) References Cited

U.S. PATENT DOCUMENTS 6,310,883 B1   10/2001   Mann et al.
6,801,502 B1   10/2004   Rexford et al.
(Continued)

OTHER PUBLICATIONS

Computer Scientists Break the 'Traveling Salesperson' Record, Wired Magazine. Oct. 10, 2020; pp. 1-11.
(Continued)

*Primary Examiner* — Chi H Pham
*Assistant Examiner* — Vladislav Y Agureyev
(74) *Attorney, Agent, or Firm* — Guntin & Gust, PLC; Douglas Schnabel

(57) ABSTRACT

Aspects of the subject disclosure may include, for example, embodiments and a method. The method includes iteratively providing messages to each Node Processor. Each Node Processor represents a node of a group of nodes. The iteratively providing of the messages comprises providing first messages. Each first message includes a cost associated with a path of nodes visited by each first message. A selected path is obtained from each node having a lowest cost of a group of common endpoint costs for paths having common endpoints. A next group of messages includes the selected path. The iteratively providing of the messages results in selected paths. Also, the method include determining a target path from a remaining path. Other embodiments are disclosed.

20 Claims, 29 Drawing Sheets

Related U.S. Application Data which is a continuation of application No. 16/159,239, filed on Oct. 12, 2018, now Pat. No. 10,812,371.

(51) Int. Cl.
  *H04L 45/48* (2022.01)
  *G06Q 10/04* (2012.01)
  *G06F 9/54* (2006.01)

(52) U.S. Cl.
  CPC .......... *H04L 45/124* (2013.01); *H04L 45/127* (2013.01); *H04L 45/48* (2013.01); *G06F 9/546* (2013.01)

(58) Field of Classification Search
  CPC ......... H04L 45/18; H04L 45/20; H04L 45/22; H04L 45/24; H04L 45/26; H04L 45/34; H04L 45/48; H04L 41/12; H04W 40/02; H04W 84/18; H04W 92/02
  See application file for complete search history.

(56) References Cited

U.S. PATENT DOCUMENTS

| | | |
|---|---|---|
| 6,813,272 B1 | 11/2004 | An et al. |
| 7,046,634 B2 | 5/2006 | Wong et al. |
| 7,286,480 B2 | 10/2007 | Carpenter et al. |
| 7,403,482 B2 | 7/2008 | Izmailov et al. |
| 7,466,688 B2 | 12/2008 | Alicherry et al. |
| 7,468,946 B2 | 12/2008 | Yucel |
| 7,903,563 B2 | 3/2011 | Schollmeier et al. |
| 7,907,596 B2 | 3/2011 | Bauer et al. |
| 7,961,626 B2 | 6/2011 | Reeve |
| 9,185,027 B2 | 11/2015 | Beheshti-Zavareh et al. |
| 9,521,067 B2 | 12/2016 | Michael et al. |
| 9,674,082 B2 | 6/2017 | Guo et al. |
| 9,794,165 B1 | 10/2017 | Wood |
| 9,911,088 B2 | 3/2018 | Nath et al. |
| 10,502,578 B2 | 12/2019 | Chen et al. |
| 10,656,645 B1 | 5/2020 | Sturges et al. |
| 2005/0122955 A1 | 6/2005 | Lin et al. |
| 2010/0332436 A1 | 12/2010 | Yanagisawa |
| 2012/0014388 A1 | 1/2012 | Shinohara et al. |
| 2012/0137021 A1 | 5/2012 | Chiueh et al. |
| 2012/0287791 A1 | 11/2012 | Xi et al. |
| 2013/0279323 A1 | 10/2013 | Allan |
| 2013/0308463 A1 | 11/2013 | Shinohara et al. |
| 2014/0046882 A1 | 2/2014 | Wood |
| 2014/0098711 A1 | 4/2014 | Thubert et al. |
| 2014/0172738 A1 | 6/2014 | Schulz et al. |
| 2015/0236945 A1 | 8/2015 | Michael et al. |
| 2015/0319078 A1 | 11/2015 | Lee et al. |
| 2016/0323127 A1 | 11/2016 | Pande et al. |
| 2017/0161609 A1 | 6/2017 | Wood et al. |
| 2017/0171066 A1 | 6/2017 | Hao et al. |
| 2017/0310595 A1 | 10/2017 | Avidar et al. |
| 2018/0109439 A1 | 4/2018 | Chen |
| 2018/0158013 A1 | 6/2018 | Fu et al. |
| 2018/0158022 A1 | 6/2018 | Fu et al. |
| 2018/0231984 A1 | 8/2018 | Alonso-Mora et al. |
| 2018/0337773 A1 | 11/2018 | Suzuki et al. |
| 2018/0364061 A1* | 12/2018 | Chen .................. G01C 21/3605 |
| 2019/0020573 A1 | 1/2019 | Chen et al. |
| 2019/0036810 A1 | 1/2019 | Michael et al. |
| 2019/0238450 A1 | 8/2019 | Michael et al. |
| 2019/0372889 A1* | 12/2019 | Michael ................ H04L 45/70 |
| 2020/0120012 A1 | 4/2020 | Meredith et al. |
| 2020/0382410 A1 | 12/2020 | Meredith et al. |
| 2021/0006490 A1* | 1/2021 | Michael ............... H04L 41/142 |
| 2022/0006726 A1* | 1/2022 | Michael ............... H04L 45/745 |
| 2022/0086079 A1 | 3/2022 | Meredith et al. |

OTHER PUBLICATIONS https://en.wikipedia.org/wiki/NP-completeness; Jun. 22, 2018; pp. 1-7.

https://en.wikipedia.org/wiki/NP-hardness; Jun. 22, 2018; pp. 1-3.

https://en.wikipedia.org/wiki/Travelling_salesman_problem; Jun. 22, 2018 pp. 1-16.

Haist, Tobias et al., "An Optical Solution for the Traveling Salesman Problem," 15 Optics Express 10473 (2007), pp. 1-10.

Haist, Tobias et al., "An Optical Solution for the Traveling Salesman Problem: erratum" https://www.osapublishing.org/oe/abstract.cfm?uri=oe-15-20-12627; Oct. 1, 2007, vol. 15, No. 20, Optics Express 12627, 1 page.

Jaillet, Patrick, "Shortest path problems with node failures." Networks 22.6; (1992): 589-605.

Kubota, Taylor, "Stanford researchers create new special-purpose computer that may someday save us billions," Stanford University web site News section, Oct. 20, 2016, pp. 1-4.

McMahon, Peter L. et al., "A fully programmable 100-spin coherent Ising machine with all-to-all connections," 354 SCIENCE 614 (2016), pp. 1-9.

Nardelli, Enrico et al., Nardelli, Enrico, Guido Proietti, and Peter Widmayer. "Finding the most vital node of a shortest path." Theoretical computer science 296.1 (2003): 167-177.

Oltean, M. et al., Solving NP-complete problems with delayed signals an overview of current research directions, arXiv (2015), pp. 1-14.

Oltean, Mihai, "A Light-Based Device for Solving the Hamiltonian Path Problem," Unconventional Computation (2006 conference), pp. 1-17.

Sun, Chonghui et al., "Solving the Hamiltonian path problem using optical fiber network," 15th Int'l Conf. Optical Communications & Networks (IEEE 2016), abstract, 1 page.

Author Unknown "Can lightning be used to solve NP-complete problems?"; https://physics.stackexchange.com/questions/28311/can-lightning-be-used-to-solve-np-complete-problems (2014), 1 page.

Vazquez, Maria R. et al., "Optical NP problem solver on laser-written waveguide platform," 26 Optics Express 702 (2018); pp. 1-9.

Woollaston, Victoria, "Revolutionary light-based computer uses magnets to solve complex problems," Wired UK (Oct. 22, 2016), pp. 1-9.

Wu, Kan et al., "An optical fiber network oracle for NP-complete problems," 3 Light: Science & Applications 147 (2014), pp. 1-5.

Zyga, Lisa, "Optical oracle' could quickly solve complex computing problems," phys.org Mar. 31, 2014; pp. 1-4.

\* cited by examiner

| S to A to B to C to Int=11 | S to A to C to B to Int=12 | S to B to A to C to Int=17 | S to B to C to A to Int=15 | S to C to A to B to Int=12 | S to C to B to A to Int=9 |

| S to A to B to C=5 | S to A to C to B=10 | S to B to A to C=11 | S to B to C to A=12 | S to C to A to B=10 | S to C to B to A=6 |

| S to A to B=3 | S to A to C=8 | S to B to A=5 | S to B to C=6 | S to C to A=9 | S to C to B=5 |

| S to A=2 | S to B=4 | S to C=3 | A to B=1 | A to C=6 | B to C=2 | A to Int=3 | B to Int=2 | C to Int=6 |

FIG. 2B

| Int to D to E to F to Dest=9 | Int to D to F to E to Dest=14 | Int to E to D to F to Dest=13 | Int to E to F to D to Dest=15 | Int to F to D to E to Dest=14 | Int to F to E to D to Dest=11 |
|---|---|---|---|---|---|
| Int to D to E to F=6 | Int to D to F to E=10 | Int to E to D to F=10 | Int to E to F to D=9 | Int to F to D to E=10 | Int to F to E to D=5 |

| Int to D to E=5 | Int to D to F=9 | Int to E to D=4 | Int to E to F=3 | Int to F to D=8 | Int to F to E=3 |
|---|---|---|---|---|---|

| Int to D=3 | Int to E=2 | Int to F=2 | Int to E=2 | Int to F=6 | E to F=6 | D to Dest=6 | E to Dest=6 | F to Dest=3 |
|---|---|---|---|---|---|---|---|---|

FIG. 2D

TIME SEQUENCE

| Index | Nodes | Time | Index | Nodes | Time |
|---|---|---|---|---|---|
| 1 | S to A | 2 | 22 | S to C to B to A to Int to D | 12 |
| 2 | S to C | 3 | 23 | S to C to B to A to Int to E to F | 13 |
| 3 | S to A to B | 3 | 24 | S to C to B to A to Int to E | 13 |
| 4 | S to B | 4 | 25 | S to C to B to A to Int to F to D | 13 |
| 5 | S to B to A | 5 | 26 | S to C to B to A to Int to E to D | 14 |
| 6 | S to C to B | 5 | 27 | S to B to C to A to Int | 15 |
| 7 | S to A to B to C | 5 | 28 | S to C to B to A to Int to D to E | 15 |
| 8 | S to B to C | 6 | 29 | S to C to B to A to Int to D to F | 15 |
| 9 | S to C to B to A | 6 | 30 | S to C to B to A to Int to F to E | 15 |
| 10 | S to C to A | 8 | 31 | S to B to A to C to Int | 17 |
| 11 | S to C to A | 9 | 32 | S to C to B to A to Int to F to D | 17 |
| 12 | S to C to B to A to Int | 9 | 33 | S to C to B to A to Int to D to F | 18 |
| 13 | S to A to C to B | 10 | 34 | S to C to B to A to Int to D to E to F to Dest | 18 |
| 14 | S to B to A to C | 10 | 35 | S to C to B to A to Int to D to F | 19 |
| 15 | S to B to A to C | 11 | 36 | S to C to B to A to Int to E | 19 |
| 16 | S to A to B to C to Int to E | 11 | 37 | S to C to B to A to Int to E to F | 19 |
| 17 | S to C to B to A to Int to F | 11 | 38 | S to C to B to A to Int to D | 19 |
| 18 | S to B to A to C to Int to F | 11 | 39 | S to C to B to A to Int to F to E | 21 |
| 19 | S to B to C to A | 12 | 40 | S to C to B to A to Int to D | 21 |
| 20 | S to A to C to B to Int | 12 | 41 | S to C to B to A to Int to F to D to Dest | 22 |
| 21 | S to C to A to B to Int | 12 | 42 | S to C to B to A to Int to E to F | 23 |
|   |   |   | 43 | S to C to B to A to Int to F to D to E to Dest | 25 |

| 1st Iteration | 2nd Iteration | 3rd Iteration | 4th Iteration | 5th Iteration | 6th Iteration |
|---|---|---|---|---|---|
| S-A=3 | S-B-A=6 | S-B-C-A=14 | S-B-C-F-E=21 | S-B-C-F-E-D=31 | S-B-C-F-E-D-A=37 |
| S-B=1 | S-B-C=4 | S-B-C-F=13 | S-B-C-F-D=25 | | |
| S-C=2 | S-B-E=5 | | | | |
| KMS=1 | KMS=4 | KMS=13 | KMS=21 | KMS=31 | KMS=37 |

| 1st Iteration | 2nd Iteration | 3rd Iteration | 4th Iteration | 5th Iteration | 6th Iteration |
|---|---|---|---|---|---|
| S-A=3 | S-B-A=6 | S-B-C-A=14* | S-C-B-E-D=19* | S-C-B-A-D-E=26 | S-C-B-A-D-E-F=34 |
| S-B=1 | S-B-C=4 | S-B-C-F=13* | S-C-B-E-F=17 | S-C-B-A-D-F=28** | KMS=34 |
| S-C=2 | S-B-E=5 | S-B-E-D=15* | S-C-B-A-D=16 | S-C-B-E-F-D=29** | |
| KMS=1 | S-C-A=12* | S-B-E-F=13* | S-A-B-C-F=20* | KMS=26 | |
| | S-C-B=5 | S-C-B-A=10 | S-B-A-D-E=22** | | |
| | S-C-F=11* | S-C-B-E=9 | S-B-A-D-F=24*** | | |
| | S-A-B=8 | S-B-A-C=16** | S-A-B-E-D=22** | | |
| | S-A-C=13** | S-B-A-D=12 | S-A-B-E-F=20* | | |
| | S-A-D=9 | S-A-B-C=11 | KMS=16 | | |
| | KMS=4 | S-A-B-E=12 | | | |
| | | S-A-D-E=19*** | | | |
| | | S-A-D-F=21**** | | | |
| | | KMS=9 | | | |

2nd Seq Bucket 5th Iteration:

| 5th Iteration | 6th Iteration |
|---|---|
| S-C-B-A-D-F=28 | S-C-B-A-D-F-E=36 |
| S-C-B-E-F-D=29 | S-C-B-E-F-D-A=35 |

1st Seq Bucket 4th Iteration:

| 4th Iteration | 5th Iteration | 6th Iteration |
|---|---|---|
| S-C-B-E-D=19 | S-C-B-E-D-A=25 | S-A-B-C-F-E-D=38 |
| S-A-B-C-F=20 | S-C-B-E-D-F=31 | S-A-B-C-F-D-E=42 |
| S-A-B-E-F=20 | S-A-B-C-F-D=32 | |
| | S-A-B-C-F-E=28 | |
| | S-A-B-E-F-C=29 | |
| | S-A-B-E-F-C=29 | |
| | S-A-B-E-F-D=32 | |

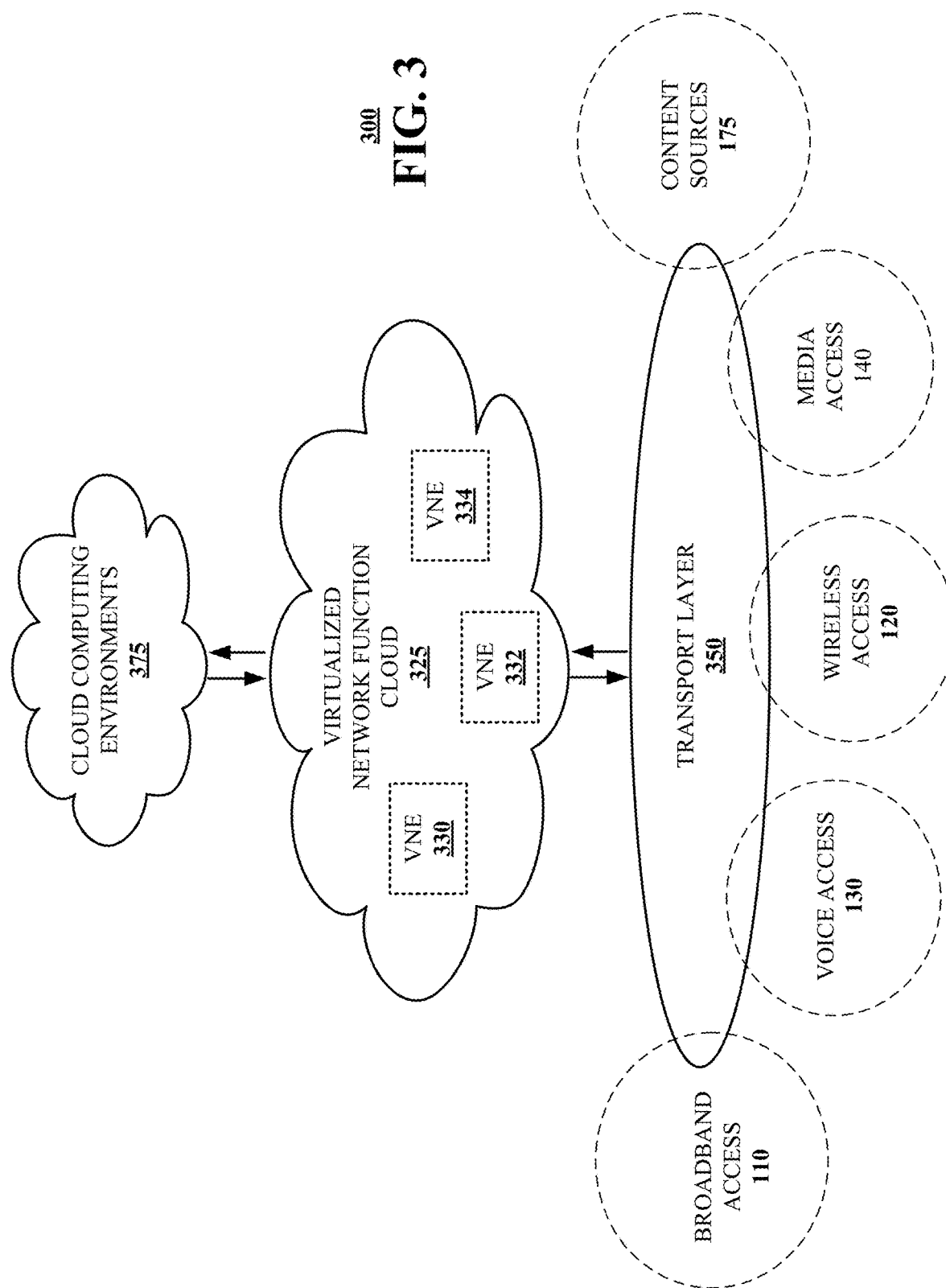

METHODS, DEVICES AND SYSTEMS FOR DETERMINING A TARGET PATH

CROSS REFERENCE TO RELATED APPLICATIONS

This application is a continuation-in-part of U.S. patent application Ser. No. 16/998,813 filed on Aug. 20, 2020, which is a continuation of U.S. patent application Ser. No. 16/159,239 (now U.S. Pat. No. 10,812,371) filed on Oct. 12, 2018. All sections of the aforementioned application(s) and/or patent(s) are incorporated herein by reference in their entirety.

FIELD OF THE DISCLOSURE

The subject disclosure relates to methods, devices, and systems for determining a target path for a network.

BACKGROUND

The traveling salesman problem is one in which a target path is found between a starting point and stopping point with several intermediate nodes. The target path can be a shortest path or most efficient path. Further, the target path includes each and every one of the intermediate nodes. In addition, the starting point and stopping point can be the same node. The calculating of the target path can require many computations and take significant time and processing resources.

BRIEF DESCRIPTION OF THE DRAWINGS

Reference will now be made to the accompanying drawings, which are not necessarily drawn to scale, and wherein:

FIGS. 2A-2F are block diagrams and associated paths illustrating an example, non-limiting embodiment of a system functioning within the communication network of FIG. 1 in accordance with various aspects described herein.

FIGS. 2G-2O are diagrams of associated paths illustrating an example, non-limiting embodiment of systems functioning within the communication network of FIG. 1 in accordance with various aspects described herein.

FIGS. 2Q-2U are block diagrams and associated paths illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
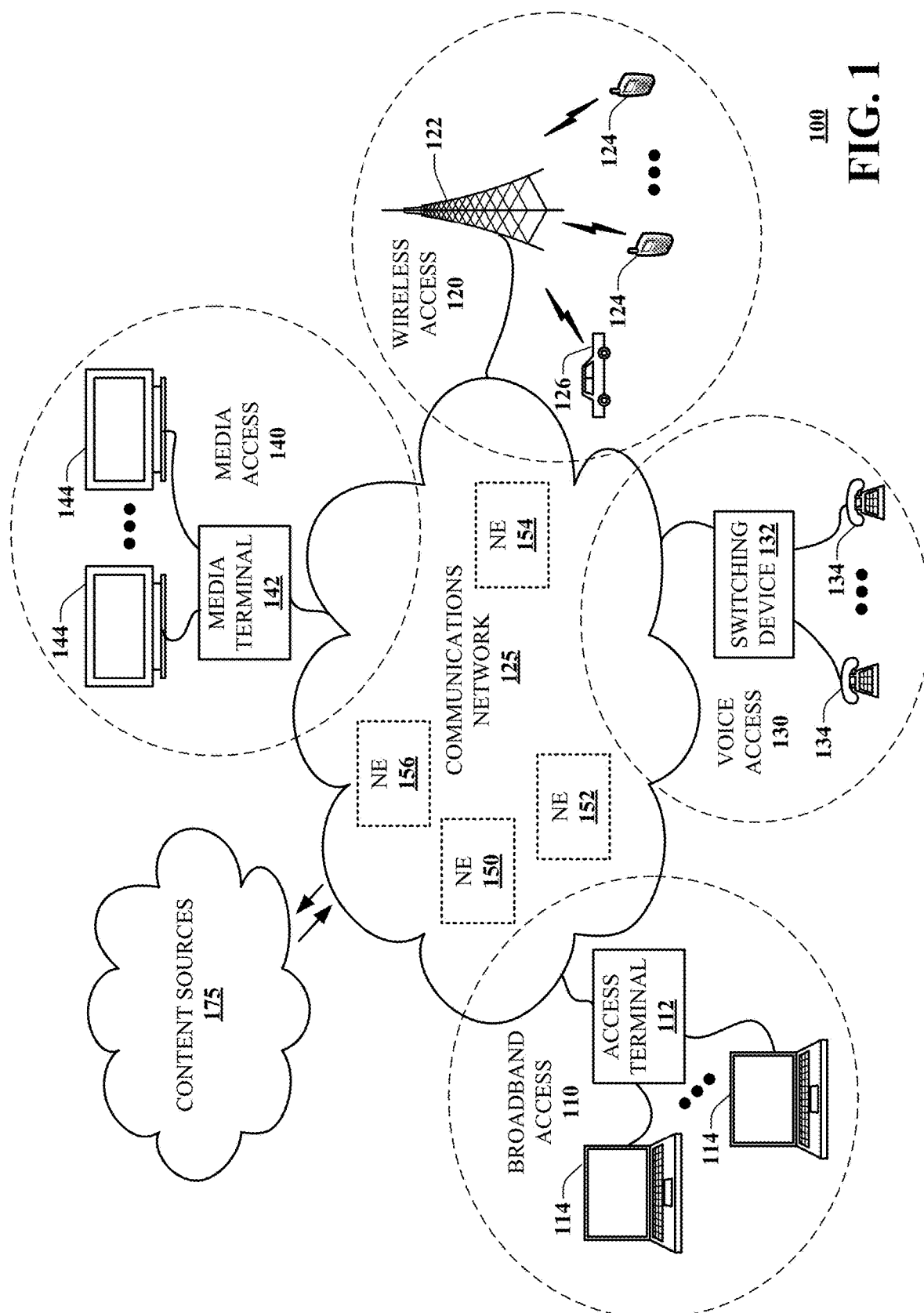
FIG. 1 is a block diagram illustrating an example, non-limiting embodiment of a communications network in accordance with various aspects described herein.

The subject disclosure describes, among other things, illustrative embodiments iteratively providing, from a Message Handler of a processing system, messages to each of a group of Node Processors of the processing system. Each of the group of Node Processors represents a node of a group of nodes also called a graph of the nodes. The iteratively providing of the messages comprises providing, by the Message Handler to a Node Bus, a group of first messages. Each first message includes a cost associated with a path of nodes visited by each first message. Further, the iteratively providing of the messages comprises determining, by each of the group of Node Processors, paths having common endpoints among a portion of the group of first messages, identifying, by each of the group of Node Processors, a cost for each of the paths having common endpoints resulting in a group of common endpoint costs, identifying, by each of the group of Node Processors, a lowest cost from among the group of common endpoint costs, identifying, by each of the group of Node Processors, a selected path associated with the lowest cost, wherein a next group of messages includes the selected path. The iteratively providing of the messages results in rejected or pruned paths having higher costs among any set of paths traversing a common set of nodes. Also, embodiments include determining, by the processing system, a target path remaining after pruning paths throughout the graph of nodes. Other embodiments are described in the subject disclosure.

One or more of the techniques described herein can be applied to various types of optimization problems that seek to more efficiently utilize resources where costs associated with those resources are known. One or more solutions to the particular problem can be determined according to the exemplary embodiments described herein.

One or more aspects of the subject disclosure include a method. The method, comprising iteratively providing, from a Message Handler of a processing system, messages to each of a group of Node Processors of the processing system. Each of the group of Node Processors represents a node of a group of nodes. The iteratively providing of the messages comprises providing, by the Message Handler to a Node Bus, a group of first messages. Each first message includes a cost associated with a path of nodes visited by each first message. Further, the iteratively providing of the messages comprises determining, by each of the group of Node Processors, paths having common endpoints among a portion of the group of first messages, identifying, by each of the group of Node Processors, a cost for each of the paths having common endpoints resulting in a group of common endpoint costs, identifying, by each of the group of Node Processors, a lowest cost from among the group of common endpoint costs, identifying, by each of the group of Node Processors, a selected path associated with the lowest cost, wherein a next group of messages includes the selected path. The iteratively providing of the messages results in rejected or pruned paths having higher costs among any set of paths traversing a common set of nodes. Further, the method comprises determining, by the processing system, a target path remaining after pruning paths throughout the graph of nodes.

One or more aspects of the subject disclosure include a device, a processing system including a processor, a group of Node Processors, and a Message Handler. Each of the group of Node Processors represents a node of a group of nodes. A memory that stores executable instructions that, when executed by the processing system, facilitates performance of operations. The operations comprising iteratively providing messages to each of the group of Node Processors. The iteratively providing of the messages comprises providing a group of first messages by the Message Handler to a Node Bus. Each first message includes a cost associated with a path of nodes visited by each first message. Further, the iteratively providing of the messages comprises determining by each of the group of Node Processors, paths having common endpoints among a portion of the group of first messages, identifying by each of the group of Node Processors, a cost for each of the paths having common endpoints resulting in a group of common endpoints costs, identifying by each of the group of Node Processors a lowest cost from among the group of common endpoint costs, identifying by each of the group of Node Processors a selected path associated with the lowest cost. A next group of messages includes the selected path. The iteratively providing of the messages results in a rejected or pruned paths having higher costs among any set of paths traversing a common set of nodes. Operations can include determining a target path remaining after pruning paths throughout the graph of nodes.

One or more aspects of the subject disclosure include a machine-readable medium, comprising executable instructions that, when executed by a processing system including a processor, a group of Node Processors, and a Message Handler. Each of the group of Node Processors represents a node of a group of nodes, facilitate performance of operations. The operations comprise iteratively providing messages to each of the group of Node Processors. The iteratively providing of the messages comprises providing a group of first messages by the Message Handler to a Node Bus. Each first message includes a quantifiable metric associated with a path of nodes visited by each first message. Further, the iteratively providing of the messages comprises determining by each of the group of Node Processors, paths having common endpoints among a portion of the group of first messages. Each of the paths having common endpoints traverses a same subgroup of the group of nodes. In addition, the iteratively providing of the messages comprises identifying by each of the group of Node Processors, a quantifiable metric for each of the paths having common endpoints resulting in a group of common endpoint quantifiable metrics, identifying by each of the group of Node Processors a lowest quantifiable metric from among the group of common endpoint quantifiable metrics, identifying by each of the group of Node Processors a selected path associated with the lowest quantifiable metric. A next group of messages includes the selected path. The iteratively providing of the messages results in a rejected or pruned paths having higher costs among any set of paths traversing a common set of nodes. Operations can include determining a target path remaining after pruning paths throughout the graph of nodes. Referring now to FIG. 1, a block diagram is shown illustrating an example, non-limiting embodiment of a communications network 100 in accordance with various aspects described herein. System 200 in FIG. 2A and the systems in FIGS. 2H-2M can be located in communication network 100 and implement the method 260 as described herein.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
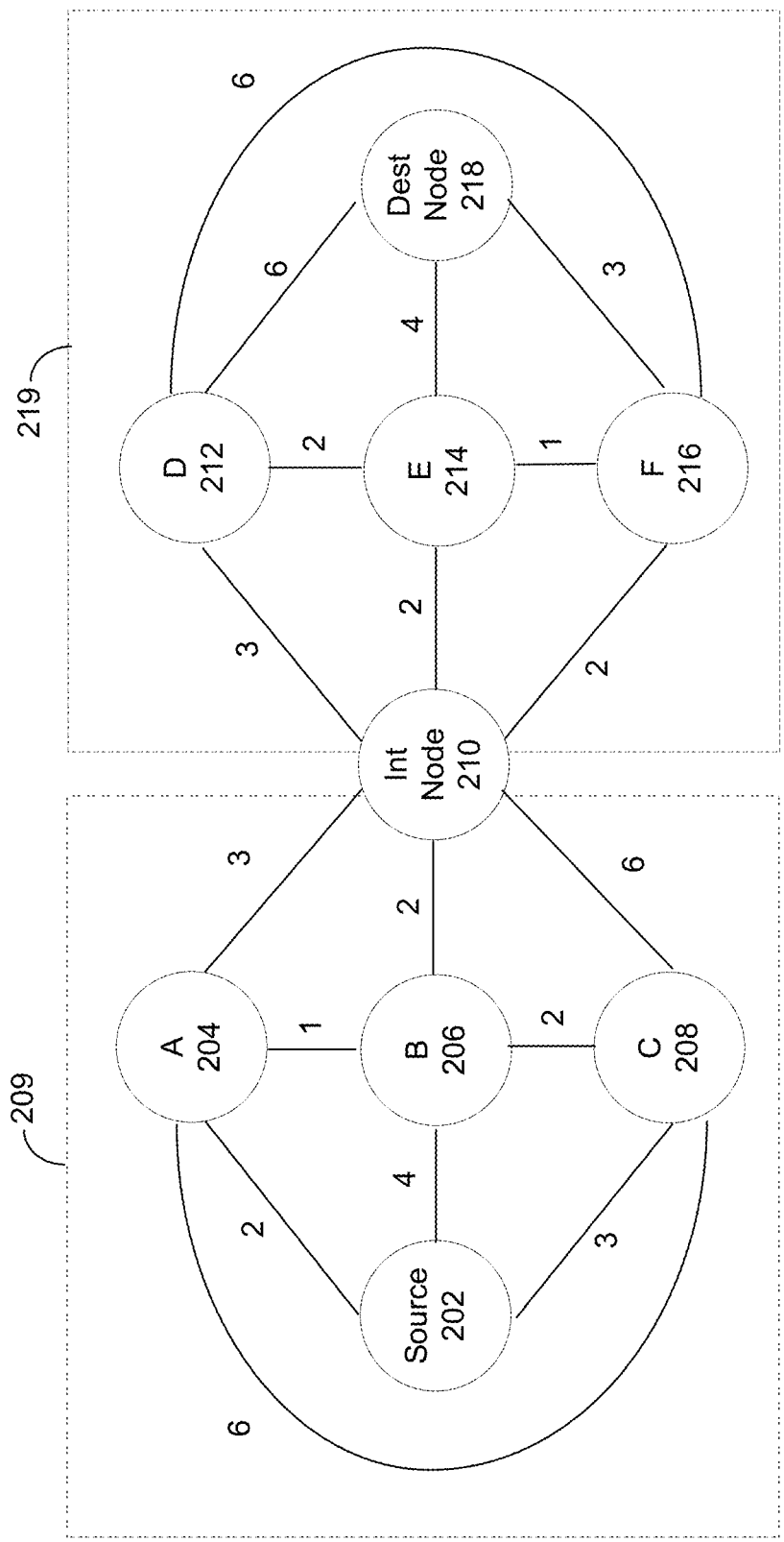

FIGS. 2A-2F are block diagrams and associated paths illustrating an example, non-limiting embodiment of a system functioning within the communication network of FIG. 1 in accordance with various aspects described herein. Further, the embodiments shown in FIGS. 2A-2F illustrate a concept of pruning paths in calculating a target path (that can be a complete shortest path). Pruning can include discarding intermediate paths that may be costlier than less costly intermediate paths. Referring to FIG. 2A, the system 200 comprises group nodes 202-218 including a source node 202, an intermediate 210, and a destination node 218, all of which interconnected to each other. In further embodiments, the group of nodes 202-218 may be processors (i.e. Node Processors) in a computing/processing environment including a cloud computing environment and/or virtual computing environment. In additional embodiments, the group of nodes may be network elements in a communication network. In some embodiments, the second destination node can be the same node as the source node. Further, an intermediate node 210 can be identified as node within the group of nodes 202-218 that is traversed between a first portion of the group of nodes 209 and a second portion of the group of nodes 219. The group of nodes can be a network of nodes or a collection of nodes each of which implement functions (some of which may be the same). The embodiments shown in FIG. 2A-2F use intermediate node 210 as an example node to illustrate pruning intermediate paths in calculating a target path (e.g. complete shortest path).

In one or more embodiments, a server (or group of servers) that can be one or a portion of the group of nodes 202-218 can determine a target path between the source node 202 and the destination node 218 that includes each of the nodes (204-216). In addition, the server can be an administration service or processor separate or outside of the group of nodes though the preferred embodiment is for each node in the graph of nodes to be represented by its own server or computer processor called a Node Processor. Further, the servers can identify a first target path for the first portion of the group of nodes 209 and identify a second target path for a second portion of the first group of nodes 219. The first target path or second target path can be a shortest path or a most efficient path. The first target path and the second target path can be combined to determine an overall target path. However, note that every intermediate node conducts pruning at the same time such that although FIGS. 2A-2F show the pruning from the perspective of intermediate node 210, each node 204-216 conducts pruning and an overall target path can be determined as the remaining shortest path after all pruning operations are completed.

In one or more embodiments, each link between two nodes in the group of nodes can be associated with a cost. For example, the cost between the source node 202 and node A 204 can be 4. The cost, which can also be any quantifiable metric, can be a term that can be include the time for data or message to travel, distance, monetary cost, available bandwidth, latency, throughput, risk, probability-of-success or any other metric from one node to another.

In one or more embodiments, each node can be a Node Processor within a computing environment. Any Node Processor can receive a message originating from another Node Processor and having an accumulated cost from the totality of node travels up to the other node which originates the message. The current Node Processor adds to the prior accumulated cost, the cost of travel between the node originating the message and the current node. Further, the Node Processor may request a Message Handler to drop a message onto a communication bus of the computing environment, receivable by other Node Processors in the computing environment. In this embodiment, Node Processors do not directly communicate with one another, but instead via a Message Handler that coordinates message flows on a common communication bus. For example, node A 204 can receive several messages. A first message can be received directly from the source node 202 at a cost of 2. In response to receiving the first message, node A 204 can forward provide a message to a communication bus which is received by node B 206 with accumulated costs of 3 and the intermediate node 210 with accumulated costs of 5. A second message received by node A 204 can be from the source node 202 and node B 206 at a cost of 5. In response to receiving the second message, node A 204 can provide a message which can be received by source node 202 and the intermediate node 210. The message traveling between nodes carries a history of node visitations and the source node 202, being part of the travel history, ignore the message from node A 204 which traveled from source node 202 via node B 206 and then to node A 204. Alternatively, intermediate node 210 receives the same message and does not ignore it, because the same node has not been visited previously as evidenced in the visitation record in the message. A third message is received by node A 204 from source node 202, node C 208, and node B at a cost of 6. In response to receiving the third message, node A 204 can forward a message to source node 202 and the intermediate node 210. Again, source node 202 ignores this message due to its own presence in the travel history evidenced in the visitation record in the message. Intermediate node 210 can know from the visitation records in each of the received messages that one message traversed only the source node 202 and one other node A 204. One other message added node B 206 and the third message also added node C 208. Therefore, the three messages received by the intermediate node 210 do not present the same set of visited nodes.

Referring to FIG. 2B, in one or more embodiments, the cost of each of the different, multiple paths within the group of nodes are calculated and listed for the first portion of the group of nodes 209. The Node Processor for node 210 compares the cost for all messages including a complete path from source node 202 to node 210 and having visited all other intermediate nodes in-between being node A 204, node B 206, and node C 208. Comparisons of path costs, conducted by any Node Processor, must be for paths having the same visited set of nodes. After calculating different, multiple paths, the path source node-node C-node B-node A-intermediate node is the first target path for the first portion of the group of nodes 209.

Figure 2C:
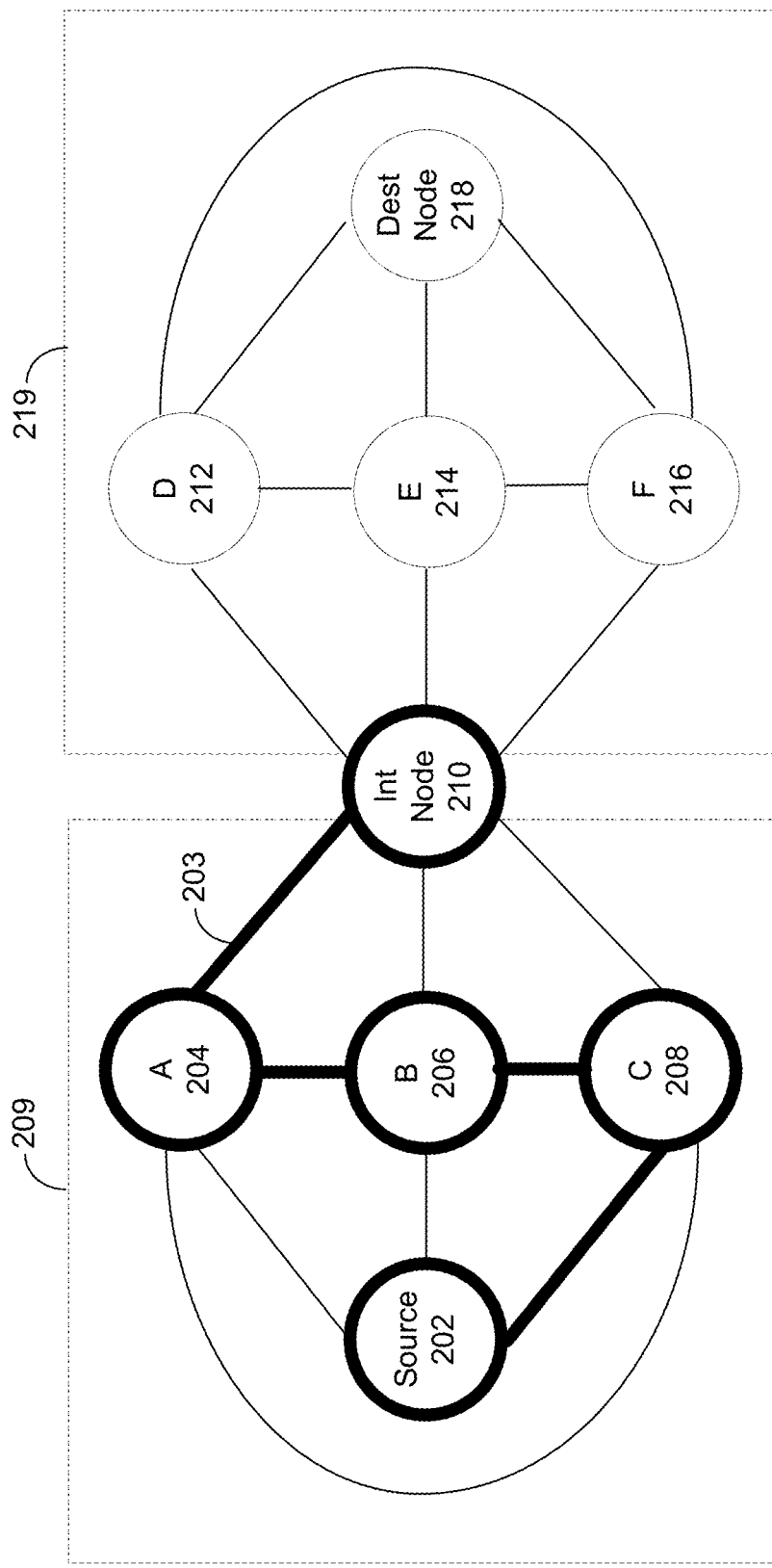

Referring to FIG. 2C, the target path 203, source node-node C-node B-node A-intermediate node is highlighted for the first portion of the group of nodes 209. Thus, the overall target path between the source node 202 and the destination node 218 can include the first target path 203 of the first portion of the group of nodes 209. Further, in determining the overall target path that includes all nodes 202-218, a server can forgo calculating the cost of any first target path that includes a path in the first portion of the group of nodes other than path 203. For example, any path between the source node 202 and the destination node 218 that includes the path source node-node A-node B-node C-*intermedia* node cannot be a target path between the source node 202 and the destination node and is not used to compute the overall target path between the source node 202 and the destination node 218. Intermediate node 210, having received multiple messages from the first portion of the group of nodes 209 including longer paths than path 203 does not provide any corresponding messages onto the communication bus for such longer paths, thereby effectively terminating any subsequent computation that would otherwise include them. The elimination of messaging to the communication bus, effects the concept of pruning of paths. Thus, from a point of view, the server or Node Processor for intermediate node 210 is able to prune or eliminate the number of calculations to determine the overall target path between the source node 202 and the destination node 218 by determining the first target path 203 of the first portion of the group of nodes 209. The target path can be a shortest path or a most efficient path.

Referring to FIG. 2D, in one or more embodiments, the cost of each of the different, multiple paths within the group of nodes are calculated and listed for the second portion of the group of nodes 219. After calculating different, multiple paths, the path intermediate node-node D-node E-node F-destination node is the second target path for the second portion of the group of nodes 219. The computation of the second target path occurs after the computation of the first target path 203 and should be considered as an extension of the first target path.

Figure 2E:
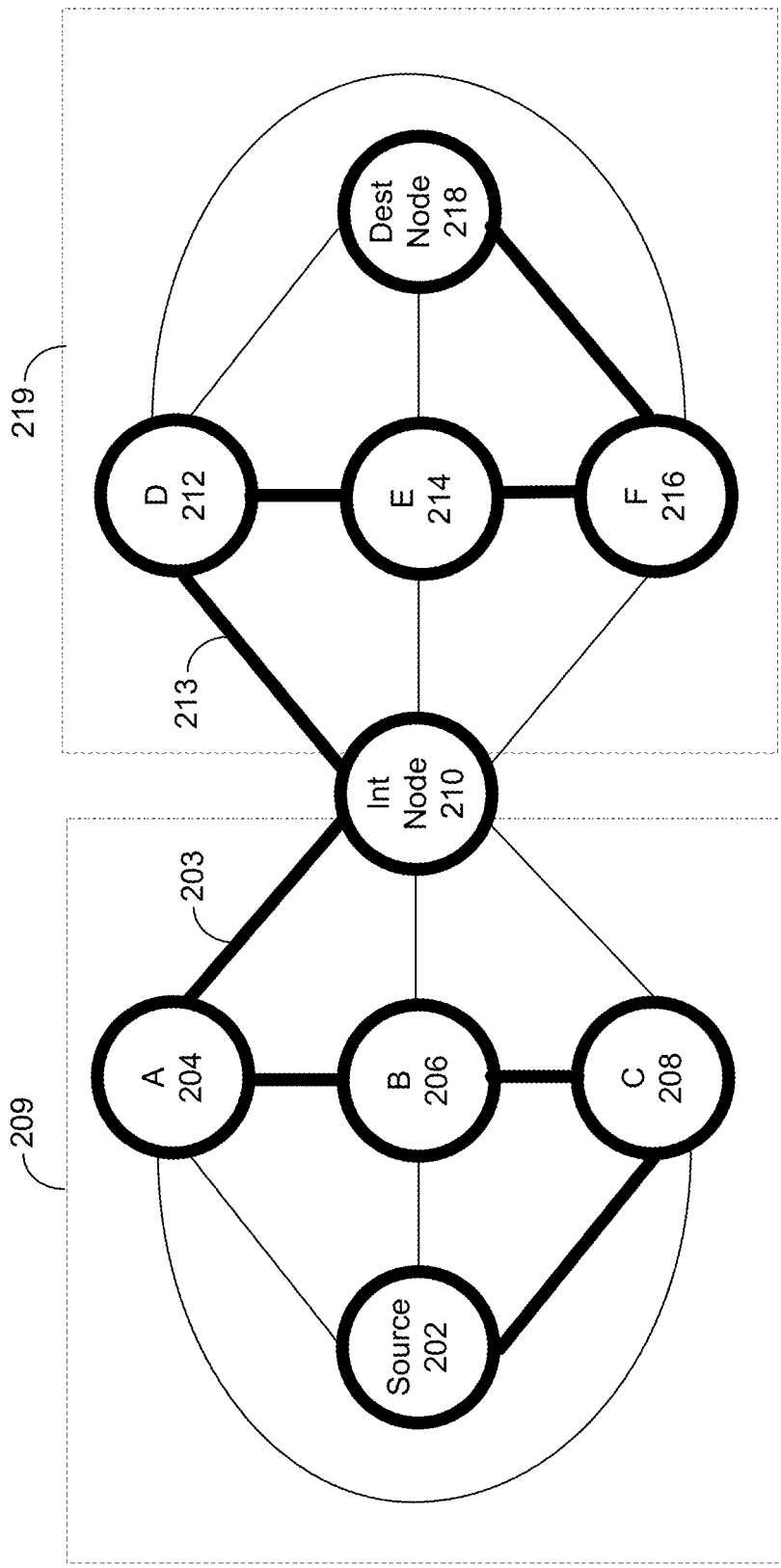

Referring to FIG. 2E, the target path 213, intermediate node-node D-node E-node F-destination is highlighted for the second portion of the group of nodes 219. Thus, the overall target path between the source node 202 and the destination node 218 can include the first target path 203 of the first portion of the group of nodes 209 and the second target path 213 of the second portion of the group of nodes 219. The overall target path is the combination of first target path 203 and second target path 213, which can be a complete path and/or shortest/most efficient path through the graph of all nodes 200.

Referring to FIG. 2F, the cost, in terms of time, is listed for each path in the group of nodes. Each path is listed according to an index for reference. Further, the calculation of paths are sequenced according to cost in terms of time. Note, in some embodiments, the cost of time does not indicate the amount of time to determine the cost of path. In such embodiments the cost of time is an indicator of when to place messages on the Node Bus to be received by all Node Processors which may then process costs by accumulating total travel costs and comparing the costs for messages associated with multiple paths having the same groups of visited nodes.

As listed in index 12, the first target path 203 for the first portion of the group of nodes is calculated with cost 9, with the first target path 203 being source node-node C-node B-node A-intermediate node. Further, the intermediate node 210 continues to provide to a messaging bus, messages that can be received by nodes D 212, node E 214, and node F 216 until index 16, with includes the path source node-node A-node B-node C-intermediate node. The path for index 16 traverses the same nodes as the first target path 203, but has more cost. Thus, the intermediate node 210 may not forward any messages from any other path traversing the set of nodes source node, node A, node B, node C, and intermediate node other than the path of index 12. Thus, the Node Processor for the intermediate node provides a message for the messaging bus corresponding to index 12, but not one for index 16. Terminating the message flow for index 16 and any other path containing the nodes source node, node A, node B, node C, intermediate node and having higher cost than index 12 removes subsequent calculations for every possible target path that would have otherwise used the paths for those indexes. Any Node Processor can prune (stop messaging) for all but one path having a common set of visited nodes. The intermediate Node Processor, can prune the paths for indices 16, 20, 21, 27, and 31, after observing the cost for each of these paths is higher than that of index 12, by terminating message flows from the intermediate node process to the messaging bus for these paths, thereby eliminating all subsequent calculations that would otherwise include these paths.

As listed in index 34, the overall target path (i.e. combination of first path 203 and second target path 213) is calculated by the Destination node processor 218 with cost 18, and includes the path source-node C-node B-node A-intermediate node-node D-node E-node F-destination node. The cost 18 is the first observed cost for this complete path and is stored by Destination node processor for comparison to costs for other equivalent paths containing the same set of visited nodes. If any other path with the same set of nodes has a higher cost, then Destination node processor prunes those paths by terminating messaging including such paths to the messaging bus. For example, the path for index 40 traverses the same nodes as the path from index 34, but has more cost 22. The Destination node processor 218 does not forward the message from index 40 to the Message Handler, thereby effectively pruning the path for index 40. If the Destination node processor 218 is the last node in the graph of all nodes, then it is synonymous with being the Stop Node and a Stop Node, observing a lowest-cost, complete path through the entire graph of nodes announces to all Node Processors that a solution has been found, which then causes all Node Processors to cease processing. This eliminates all subsequent computational costs that would otherwise occur. Also being of higher costs than the path of index 34, the paths associated with indices 41, 42, and 43, are pruned (terminated) by the Destination node processor.

In one or more embodiments, the cost for each of the first plurality of paths comprises an available bandwidth between the source node, each of the first group of intermediate nodes, and the first destination node, wherein the cost for each of the second plurality of paths comprises an available bandwidth between the first destination node, each of the second group of intermediate nodes, and the second destination node. In further embodiments, the source node, the first destination node, the second destination node, the first group of intermediate nodes, and the second group of intermediate nodes comprise a network element in a communication network.

Further, portions of embodiments can be combined with portions of other embodiments.

In one or more embodiments, to calculate the shortest path through each node in a computing environment, a signal (electrical or optical) is launched into the computing environment (circuit) having components representing the nodes to be visited. The signal would move as fast as the path would allow it to. With each node visit, the signal would be modified to reflect the visitation. Such a signal moves between the nodes, flowing like waves on a transmission line or a swimming pool. To make the computing environment behave this way, the architecture of the computing environment allocates a computing resource to each node that would receive messages from other nodes and rebroadcast them in a manner to reflect the visitation. In this manner, signals launch as waves that would automatically move between the nodes without supervision from a single computer resource. No single node has complete knowledge of actions of the other nodes, but handles its own piece of the overall computation, independent of other processors (nodes). Such a method or system can be designated as crowd processing and it is distinct from distributed computing, which shares a computing task among many computing devices, but still under the supervision of a master computing device. The nodes communicate with each other, building path knowledge along the way. A Stop Node (a final destination node—can be the same as the Start Node (e.g. source node)) processor listens for a message from any Node Processor that must have two properties to find and assert the target path through the graph of all nodes. The first property is that the message would announce that it had visited all possible nodes (complete path), and the second property is that the message would have the lowest travel time among all complete paths. Such embodiments can be time-based, indicating that the message pertaining to the shortest total path, the target path, is presented on the messaging bus before many other messages have traveled a complete path. Once this first complete path of the message is found by the Stop Processor, all remaining computation can cease because the solution has been found. Again, this is a distinctly different concept than a computer analyzing all possibilities and finding the best one. There is no centralized computing resource controlling the calculation of the shortest complete path. A message (wave) is launched and every member of the graph of nodes communicate among themselves and when the lowest cost (time) path is presented, the calculation of the shortest complete path is done. In such embodiments, the solution presents itself as a natural consequence of the flow of messages traveling through all the available nodes comprising the graph of nodes.

Conventional techniques for solving the shortest path through each node of a group of nodes cause each possible path among the nodes to be assigned a computing thread or central processing unit (CPU). Even with moderately sized groups of nodes, the total number of threads or CPUs that must be managed can exceed the administrative capability of operating systems of the computing environments for the group of nodes. Embodiments described herein instead assigns exactly one computing resource to each node, one for the Stop Node (which may be coincident with the Start Node), a Message Handler, and an Administration Processor that provides initial conditions to all other processors and an initialization message to start the processing task. With a one thousand node group, one thousand processing threads are assigned potentially across many servers that do not need to be under the control of a single computer. Conventional techniques may need billions or trillions of computing threads, which require swapping and time-sharing of the memory and CPU resources.

Figure 2G:
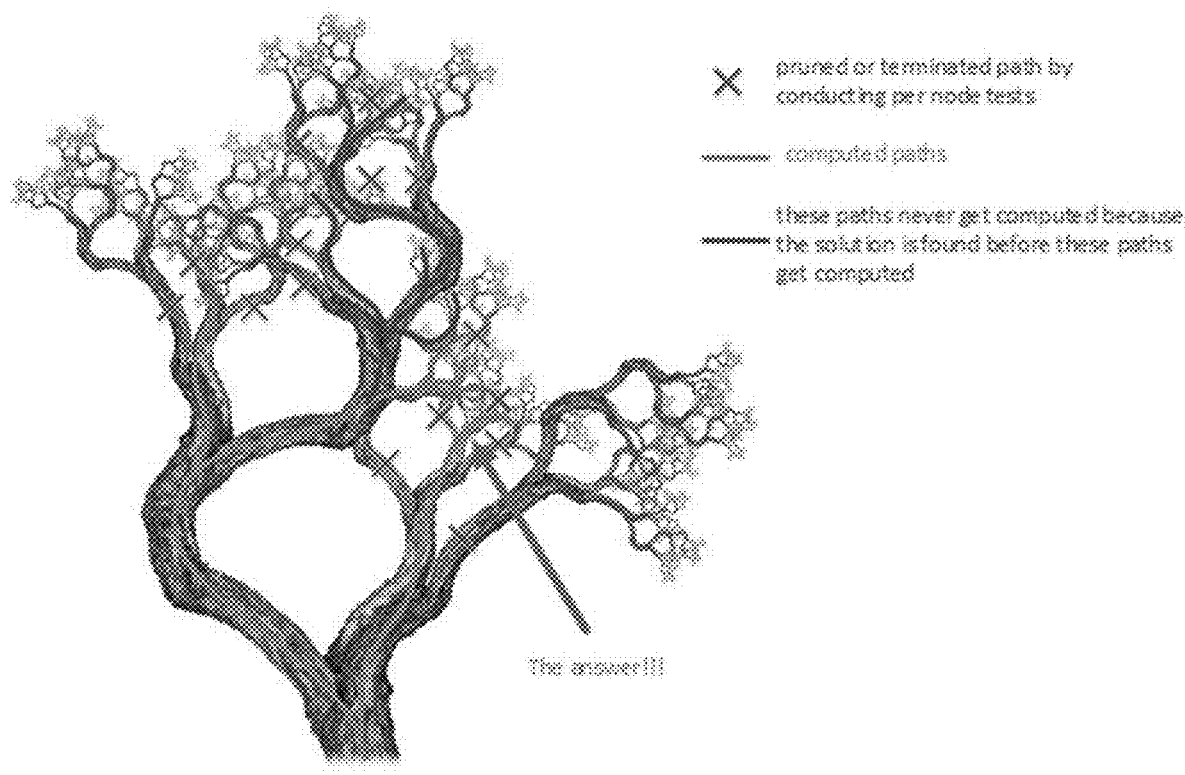

For embodiments described herein, the terms distance, time, and cost can be interchanged as the accumulating measure while the messages traverse the Node Processors. Embodiments can keep track of an accumulating quantity that could be a representation of distance, time, cost, or anything else that could be numerically accumulated. Embodiments can handle both perfect and approximate solutions. A perfect solution is one where travel can occur between any pair of nodes in the graph of all nodes. An approximate solution is one where travel between nodes is constrained (such as being limited to nearby nodes). Determining that certain paths cannot yield the shortest path, allows pruning of those paths and all larger paths including those paths up to complete paths. Path pruning early in the flow of messaging has a more significant effect on the elimination of subsequent processing than pruning later in the messaging flow. Referencing FIG. 2G, this is akin to pruning a large trunk of a tree as opposed to pruning a twig at the top of the tree. Every twig represents a computable path and pruning a large branch can eliminate millions of twigs or paths. Given the factorial (n!) growth in computational cost of the traveling salesman problem and related problems with n nodes, graphs with even hundreds of nodes can present intractably large computational costs. Some embodiments provide for large scale pruning of message flows by every node in the graph such that the composite reduction in total computational costs approaches linear growth with the number of nodes, rather than factorial growth. Benefits of some embodiments can include the ability to stop computation once a complete, shortest path is found, thereby eliminating remaining computations. For example, consider any set of visited nodes, including n nodes plus the START and STOP nodes. Exactly n!−1 branches can be pruned between START and STOP. This ability is based on a basic property of the geometry and embodiments herein exploiting it. Given any four locations (including two nodes, START, and STOP) one complete path can be pruned between START and STOP. For example, given nodes A, B, C, and D, a message can travel from A to D two ways, ABCD or ACBD. These two paths either have exactly the same length or one is longer. If, for example, ACBD is longer than ABCD, it can be seen that any path including the sequence ACBD could be shorter if that path used ABCD instead (and all other prior or subsequent nodes visits were exactly the same). This shows that any path sequence containing ACBD cannot be the target path, so any computation for any path containing ACBD can be terminated. If both paths ABCD and ACBD are equal length, one can be picked (e.g. based on a logical value such as a processor ID) and the other ignored. The task is to find "a" lowest cost path, not all equally lowest cost paths. Similarly, among any four nodes one of two possible paths can be pruned from A to B (traversing C and D), A to C (traversing B and D), B to C (traversing A and D), B to D (traversing A and C), and C to D (traversing A and B). There is another attribute of some embodiments which applies when the cost of traveling between any two nodes is bilateral. This means that distance or cost ABC is exactly the same as CBA. If path ABCD has a lower cost than ACBD, then we can use this argument to claim that path DCBA has a lower cost than DBCA. This means any path can be pruned containing the sequences ACBD or DBCA. This allows more opportunities for pruning during processing. FIG. 2G depicts the pruning of branches and the benefit of finding an early complete shortest path which terminates the remaining processing. Note, in some embodiments, a test run can be done, a priori, to determine an existence of a complete path where all nodes are visited.

In some embodiments Node Processors can be implemented as processing threads of one or more computers. Functionality of Node Processors or any other processing of the embodiment can be defined logically or virtually, e.g. virtual machine.

Figure 2H:
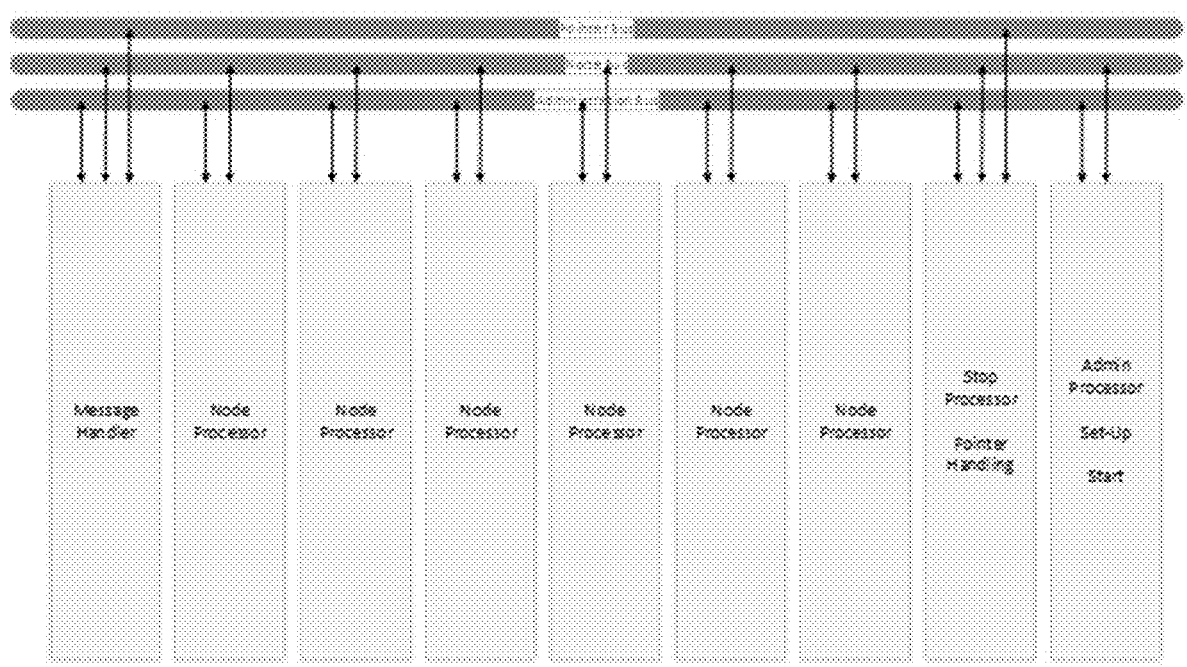
Figure 2I:
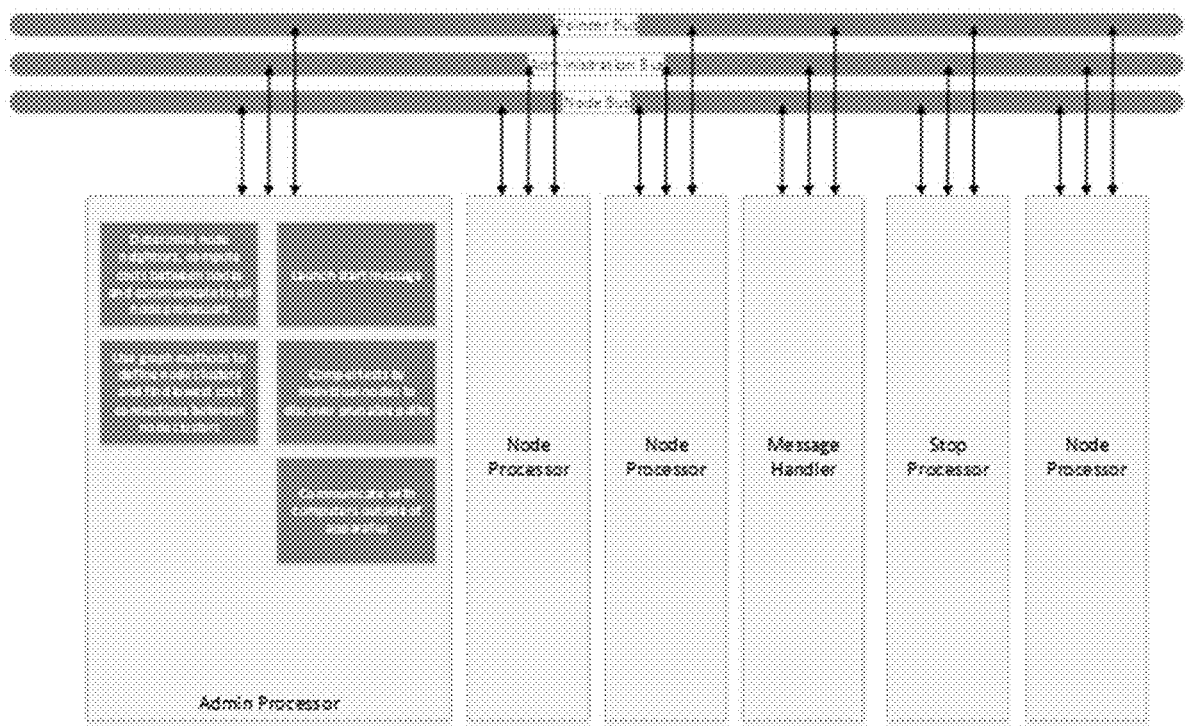

Referring to FIG. 2H, the system includes several processing components including an Administration Processor shown in FIG. 2I. The Administration Processor asserts to cost of travel between nodes. If the problem involves computing travel time between geographic nodes, the Administration Processor knows the geographic locations of start, stop, and all other nodes. The Administration Processor asserts the bilateral costs/distance/time between them as part of a problem-set-up phase of processing. In the case of the equal bilateral cost assumption between all node pairs, a special message is provided by the Administration Processor to other processors to indicate as such. In problems where visitations between nodes are constrained leading to an approximate result rather than an exact result, the Administration Processor notifies each node processor about the local, neighboring nodes that it should listen to. If the complete, shortest path is approximate, there is a potential for creating stranded islands of nodes in the graph of nodes, because the nearest neighbors to all members of a cluster are part of the cluster and not other clusters. It is possible for no members of a cluster to connect to any node outside of the cluster. Therefore, a graph theory mechanism is indicated to find clusters and also find the lowest cost connections between clusters to ensure a path to completion and no stranded clusters. The Administration Processor also initiates the final process to find the lowest cost path. Referring to FIG. 2I, the basic functionality of the Administration Processor is shown whereby it can send cost information to all other processors and also invoke a first mode of operation to test for the presence of any complete path through the node graph as well as a second mode of operation which is to find the target path.

Figure 2J:
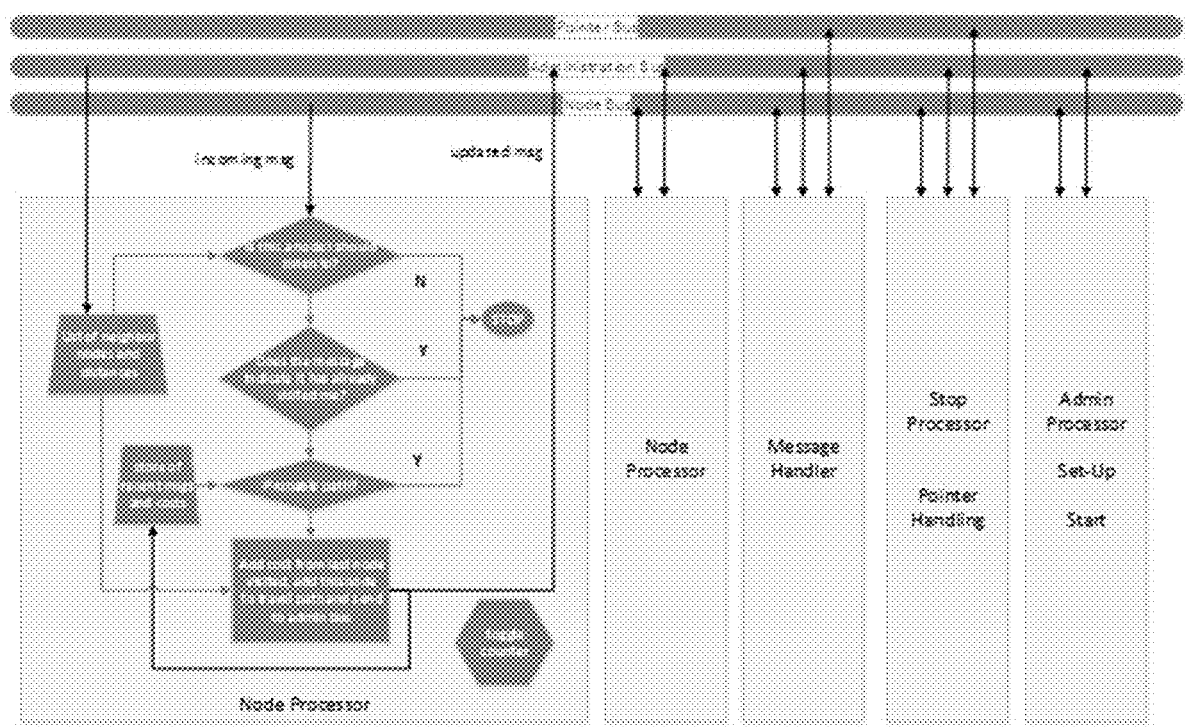

Embodiments provide one Node Processor per node. Each Node Processor receives (from the Administration Processor) a list of other nodes that are permitted to be in its path (its local neighborhood). For small groups of nodes, all Node Processors can listen to each other with manageable computational impact. For large groups of nodes, restricting node connections to a local community is one manner in which to reduce complexity with relatively low impact on finding a target path, but the result cannot be guaranteed, only approximated. However, embodiments described herein work with or without node neighbor constraints. Each Node Processor continuously monitors the Node Bus/buses and receives all of the messages deposited thereon of the form ($\text{cost}_{total\_path}$, node_mask, pointer, node $ID_5$, $\text{cost}_{54}$, node $ID_4$, $\text{cost}_{43}$, node $ID_3$, $\text{cost}_{32}$, node $ID_2$, $\text{cost}_{21}$, node $ID_1$). The node_mask provides an exact visitation record of all nodes visited and contributing to the cost, $\text{cost}_{total\_path}$. The node_mask does not show the order of historical node visitations. Only the node visitation order for the last five nodes visited is presented in the message. The remaining elements of the message provide the sequence and costs of recent node visits to be compared with the contents of other messages by any Node Processor. At the start of messaging on the Node Bus, all five historical nodes visited are exactly the Start Node and costs between them are all exactly zero. When messages have visited three nodes beyond the Start Node comparisons allow pruning to begin. At this depth of processing, Node $ID_1$, Node $ID_2$, and Node $ID_3$ still all indicate the Start Node. Only Node $ID_5$ and Node $ID_4$ show other node IDs. A Node Processor inspects the last five nodes of travel to compare costs for paths with common sets of nodes between Node $ID_1$ and the current node. There can 24 distinct paths to the current node when looking back at the last five nodes visited ((depth−1)!). All but one of these paths can be pruned. An embodiment can be built using longer sequences of prior-visited nodes than five, in which case the form of the message would merely be extended using the same logic. Looking back at the last five visited nodes yields significant pruning opportunities, but with factorial growth in the processing by the Node Processors. For instance, looking back six nodes would allow comparison of 120 paths with all pruned except one, but the cost of comparisons is increasingly as a factorial of depth. Beyond five, there is a questionable tradeoff between reduction of total path computations and Node Processor processing. The choice of this messaging depth (number of historical visited nodes) may be a determinable function of the size of the node graph and bilaterality of node pair costs. Recall, for exact solution computations, all nodes are neighbors of all other nodes. For each of the Node Bus messages received by any Node Processor, each Node Processor first checks the last visited node ID against its neighbor list to determine if it is a permitted neighbor. If not, the message is ignored, otherwise the "node mask" in the message is inspected for a self-match which could prove this node has already been visited in the history of the received message. The node mask is binary and has a position for each node in the graph of nodes. It merely indicates what nodes have been visited, but does not provide the order of visitation. If there is no self-match in the node mask, checks are run by a Node Processor on the sequence of the last 5 node IDs to compare its node visitation cost with the costs of other node sequences from other messages already received. It does this by comparing the cost (from prior messages) of visiting the same set of the 5 most-recent nodes visited, having the same starting node, but in a different sequence. For example, a Node Processor may receive a message where the last five nodes visited are JGECA. This could be compared in terms of cost to the path GJECA or JGCEA. To compare costs between any two messages, the final cost to get to the processing node must be included, not just the total cost, $\text{cost}_{total\_path}$, provided in the received messages. For example, two messages may arrive at Node Processor F containing costs for visiting prior nodes ABCDE and ACBDE respectively. In order to assert the lower cost of the two, the cost of getting to F must be included so that the total costs will be for paths ABCDEF and ACBDEF respectively. If a lower or equal cost path is observed by a Node Processor for a prior message, the current message is ignored, thereby effecting pruning of the equal or higher cost path presented in the message. If no lower cost path was previously observed by a Node Processor, the current message is updated with the cost to arrive at the current node as well as the shifting of the recent node visit information to the right and insertion of the most current node of travel. The pointer value in the message (which will be discussed further) is retained in the updated message. The node mask is then updated and the message is sent to the Message Handler processor. The Node Processor may compute that a path for the current received message has a lower cost than a prior path for which an updated message was already sent to the Message Handler. In this event, the Node Processor can send a "delete prior message" request to the Message Handler via the Administration Bus which then deletes the prior message before placing it on the Node Bus. This action obviates all subsequent processing otherwise associated with the terminated message and its path. To effect this ability to drop messages already sent to the Message Handler, a critical component of the apparatus is that messages are dropped onto the Node Bus by the Message Handler with sequentially increasing cost or time. This guarantees the prior message has not been placed onto the Node Bus yet and can therefore be deleted prior to placement. When sending messages to the Message Handler, the first Node Processor (number zero) places its message onto the Administration Bus and then electrically toggles a line or sends a unique message pattern. This line (or message) is monitored by all Node Processors and is used as a means of avoiding collisions among Node Processors on the Node Bus. Each Node Processor waits its turn as it counts the number of toggles on the line (or sends the unique message). If a Node Processor has no message to send to the Message Handler, it toggles the line on its turn anyway. When a new message is placed onto the Node Bus by the Message Handler, all Node Processors use this to reset their own toggle counter, observe the new message, conduct required processing, and then wait their turn to report back to the Message Handler. This looping continues until the Stop Processor sends a message to all other processors to stop processing. Referring to FIG. 2J, it shows the functionality of a Node Processor.

Figure 2K:
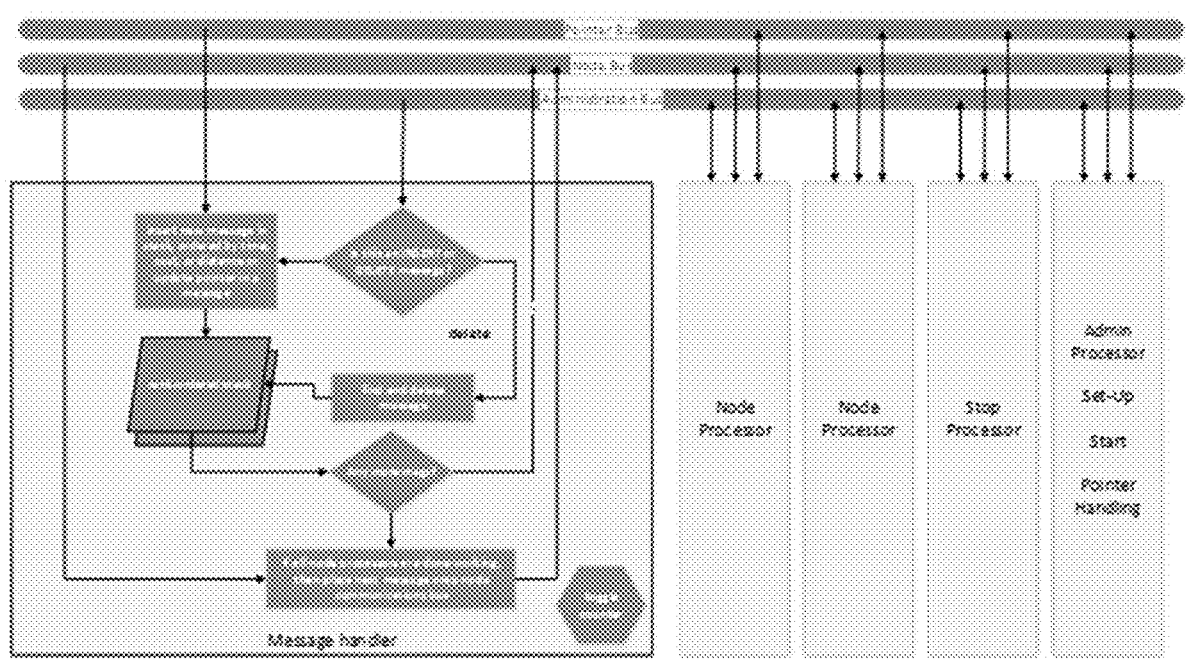
Figure 2L:
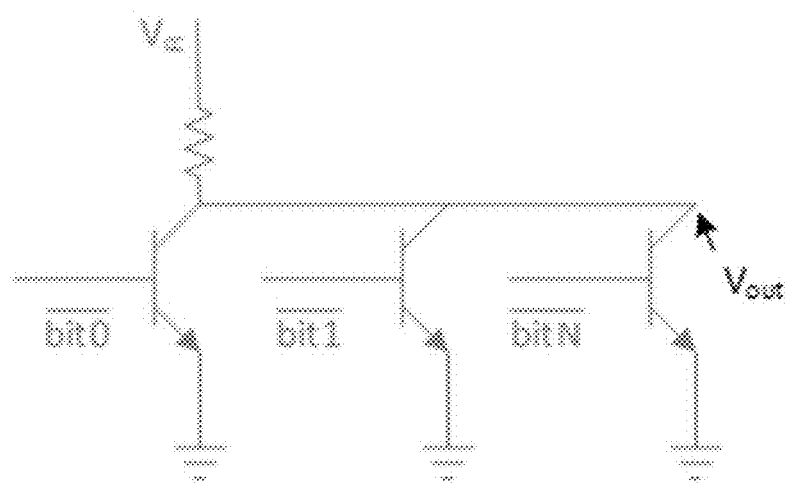

A Message Handler comprises a processor that manages the sequence (ranked by increasing time, cost, or distance) of messages it places onto the Node Bus. The Message Handler receives messages from Node Processors over the Administration Bus, receives updated pointers (that point in memory to a sequence of visited node IDs) from the Stop Processor via the Pointer Bus, and then updates messages in the stack with these updated pointers, ranked by time, distance, or cost and then places the next message in the sequence on the Node Bus after all Node Processors have completed reporting pursuant to the prior message placed onto the Node Bus. The Message Handler maintains a stack of node messages to be placed onto the Node Bus. When two messages have the same cost, the node ID of the last node visited can be used as an arbiter for ordering. For scalability, the stack may be effected as a set of stacks where each sub-stack holds messages from a prescribed subset of nodes. For example, messages one subset of nodes go to sub-stack 1 while messages from another subset of nodes go to sub-stack 2. Doing so allows the Message Handler to multi-thread and expedite message insertion and deletion in the full stack that could otherwise become significant for large groups of nodes. The embodiment of a Message Handler may also use a stack ranking architecture where stack subsets can have their own subsets in a cascade or arbitrary depth. Using multiple message stacks also implies that messages cannot be placed onto the Node Bus until the costs are compared for the "next" message on each sub-stack. This same logic applies to cascaded sub-stacks of arbitrary depth. For example, if the stack has sub-stacks (layer A) and each sub-stack has sub-stacks (layer B) the all layer B sub-stacks must have their "next" message time-compared before choosing one for each layer A sub-stack. Then all layer A times or costs are compared to arrive at a single message which is the next message to be placed on the Node Bus. Otherwise, messages could be placed on the Node Bus out of sequence. As described in the embodiments herein, the messages placed onto the Node Bus do not present 100% of visited node IDs along the traveled path. The reason is that for large groups of nodes, the bandwidth of the Administration Bus and Node Bus would be consumed by this movement of information. Pointers allow us to replace long sequences of node IDs on a traveled path with a pointer to that sequence stored on the Stop Processor. Each time a path has to diverge (branch), a new pointer is created for it by the Stop Processor and the Message Handler is made aware of that path divergence when informed by the Stop Processor via the Pointer Bus. The Message Handler can delete a message from the message stack if requested to do so by a Node Processor, which can happen if the Node Processor discovers a shorter path sequence (from the pruning process) and wants to eliminate a prior message and insert one for the shorter path. Sending any delete or add message happens when a Node Processor gets its turn to communicate on the Administration Bus. After placing a message onto the Node Bus, the Message Handler monitors the toggle line on the Administration Bus as each Node Processor takes its turn with updating the Message Handler (sometimes sending a message and sometimes not but always toggling the line at the end of its turn). The Message Handler knows how many Node Processors there are (it was informed at set up by the Administration Processor), so by observing the toggle counter, it knows when all Node Processors are done working. When it places a new message onto the Node Bus, it resets its own toggle counter, as do the Node Processors. Referring to FIG. 2K, it shows the functionality of the Message Handler.

The Stop Processor monitors the Node Bus messages and uses the node mask to identify when a path has completed visitation to all nodes. For maximum speed, a completion check on the node mask can be accomplished in hardware using open collector transistors, tied together in tandem and pulled up to a high (1) voltage state using a pull up resistor. All of the node mask bits are inverted, so if they are all in a high state (all nodes visited), the inverse is all 0s. This turns off all transistors, causing the tandem connections at all transistor collectors to be pulled high by the pull-up resistor. If any node mask bit is 0, at least one inverted bit will be in a high state, turning on at least one transistor and pulling $V_{out}$ to a low state. The Stop Processor observes a complete node visitation mask when $V_{out}$ transitions to a high state. (See FIG. 2L).

In a message with a complete node mask, the Stop Processor sees the total travel cost to the last node visited. It then adds the cost of travel between the last node and the Stop Node to the accumulated cost, thereby asserting a "complete cost". This allows the Stop Processor to have a potential target path which can be designated as the "current candidate target path". There may be a lower complete cost path that shows up later on the Node Bus if the cost of travel from its last node visited to the Stop Node is lower than for earlier messages. The target path must include the cost of the final step to the Stop Node before it can be asserted as the target path. For example, the Stop Processor may see a path (start, A, B, C, E, D) which is complete, and then the Stop Processor adds the total cost of travel between D and the Stop Node. Another message with the path (start, A, B, C, D, E) may show up on the Node Bus a bit later, but if the cost from E to the Stop Node is less than the cost from D to the Stop Node, the second message may have the lowest complete cost, distance, or time in which case it can replace the current shortest complete path. If not, the later message is ignored. When the Stop Processor sees any message on the Node Bus having a total travel cost greater than the cost of the current shortest complete path, then it is not possible for any subsequent message to have a lower total cost. This is because messages are always placed onto the Node Bus in time or cost-ordered sequence. There can never be another message with a lower travel cost presented. Since the Stop Processor can then positively know that the current shortest complete path is the "final shortest complete path", the Stop Processor then sends a message on the Node Bus to all processors to stop processing and it delivers the "final shortest complete path" to the Administration Processor via the Administration Bus. The Stop Processor also manages the pointers to arrays that contain the travelled sequences of nodes for any path. It monitors the Administration Bus and receives messages sent from Node Processors to the Message Handler. It determines when a path has to be split and it creates new pointers to the new paths and informs the Message Handler via the Pointer Bus. Because the Stop Processor performs the task of pointer maintenance, once it finds a path that has a complete node mask and the "final shortest complete path", it uses the corresponding pointer from that message to look up the exact node visitation sequence that it then sends to the Administration Processor. An additional mechanism for stopping all processing is when then Message Handler sends a message on the Node Bus that it has "no more messages". If the Stop Processor sees this message, it asserts the current shortest complete path to be the final shortest complete path and delivers the same set of information to the Administration Processor using the node visitation sequence pointed to by the last observed pointer.

In referring to the Administration Bus, this communication bus is used by the Administration Processor to initially inform all Node Processors about their node neighbor lists and the bilateral costs of travel to and from each of those neighbors, to reset all processing, clear counters, clear pointers, and inform each Node Processor about its node ID and to inform the Stop Processor and Message Handler about the total node count. This bus is also used by the Stop Processor to send the shortest complete path (the target path) to the Administration Processor at the conclusion of processing.

The Node Bus is used by the Message Handler to broadcast messages (from individual Node Processors) to all Node Processors. The messages placed on the Node Bus are placed in rank order of cost, time, or distance, thereby achieving the "flow" character of the embodiments describe herein. It is this flow character that allows one to unequivocally know when it is impossible for any remaining path to have a lower cost, time, or distance than the "current shortest complete path".

The Pointer Bus is a communication bus used to communicate pointers between the Stop Processor and the Message Handler. The Message Handler may send queries to the Stop Processor to update a pointer if needed or the Stop Processor may proactively send an update to the Message Handler on the same bus.

The upper bounds to the embodiments described herein are set by the bandwidth of these communication buses, so multiple instances of each of these buses are allowed, thereby permitting scalability.

In an exemplary embodiment, to prepare for processing, the Administration Processor determines for every node, what its neighbor nodes should be up to and including all other nodes. The Administration Processor also determines the bilateral time, distances, or costs of traveling between all node pairs that are neighbors. These neighbor relationships and costs are sent via the Administration Bus and are held in memory by the Node Processors.

After all pre-processing tasks are completed, the Administration Processor initiates the path length computations by sending a start message to the Message Handler on the Administration Bus. This start message has a start time of 0, includes a node mask which is all zeros (with optionally a single one representing the Start Node), a pointer (explained below) of 0, and includes a node ID=0 for each of the last five node IDs visited (each being the Start Node) and sends incremental travel costs between nodes of 0. The message appears in the general form: 0,000000000000000000000000,0,0,0,0,0,0,0,0,0,0 (accumulated total cost, mask, pointer, node ID5, cost54, node ID4, cost43, node ID3, cost32, node ID2, cost21, node ID1. The Message Handler immediately places this message on the Node Bus to begin processing. The Stop Processor observes this initial message on the Node Bus and creates a first pointer, called 0, pointing to an in-memory array on the Stop Processor with the single value "0" (denoting the Start Node). The Message Handler sets its own toggle counter to zero and all Node Processors, seeing the new message (total cost=0) on the Node Bus, also set their own toggle counters to zero.

Each Node Processor is constantly listening for messages on the Node Bus and conducts processing for messages originating from its "neighbor nodes" (as determined and announced by the Administration Processor via the Administration Bus during pre-processing). The first step of processing is to inspect the node mask to ensure the message has not yet traversed that node. Each node may only be visited once, so a prior visit to the node causes the message to be ignored. The Message Handler places messages on the Node Bus sequentially in time, cost, or distance as non-limiting examples. This does not mean that it places the messages on the Node Bus at the prescribed time, but instead in ascending sequence. In one or more embodiments, this temporal character can be significant or critical to the particular embodiment because it is where the "flow" characteristic is achieved, mimicking the flow of a signal through a circuit or waves moving on a surface.

Figure 2M:
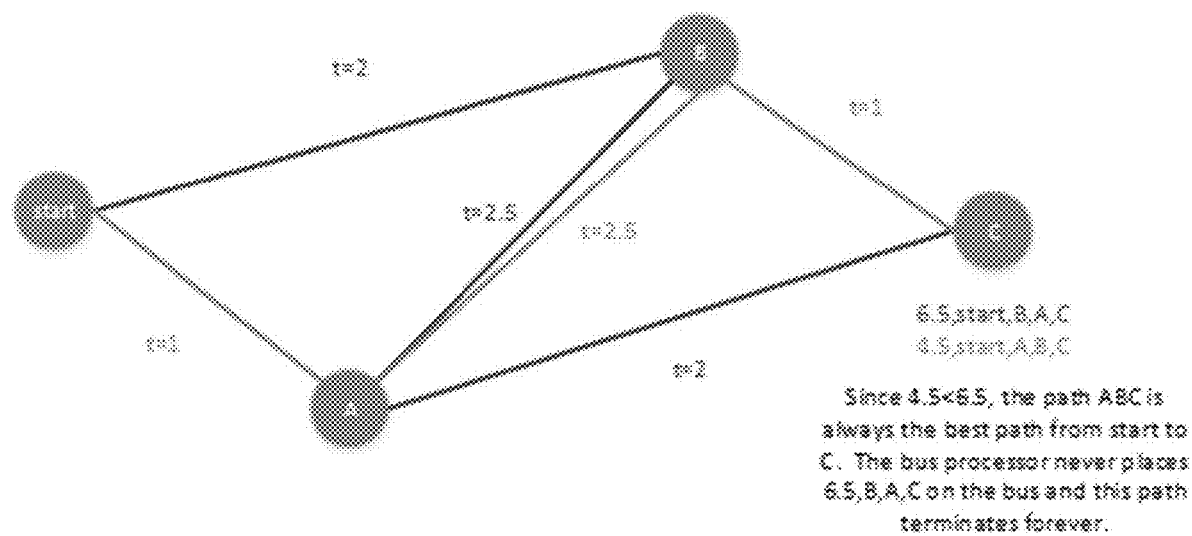

If a received message passes these tests, the last five node IDs and travel costs are checked for path pruning opportunities. FIG. 2M shows a simple example of two possible paths between start and node C, traversing node A and node B where only one path is ultimately allowed to be used.

To accomplish this pruning test, the Node Processor checks to see if it has stored a copy of a message previously sent to the Message Handler with the same node IDs as are contained in the currently received message and having the same node $ID_1$. This means the start of the five-node path begins at the same node and ends with the current node and the paths have the same visited nodes in between. If the Node Processor finds such a comparable prior message, it compares the total cost of travel to the current node for both messages. If the prior message has the lower or equal cost, the current message is discarded and nothing is sent to the Message Handler. Otherwise, a message is sent to the Message Handler to delete the prior message and the Node Processor sends a new message to the Message Handler after updating the total cost/time/distance (up to the current node), updating the node mask, retaining the same pointer, and FIFO (first in, first out) shifting the node IDs and incremental costs to the right in order to insert the current node ID and incremental cost from the last node ID. This new message is sent to the Message Handler on the Administration Bus. It does so on its turn which is determined when the toggle count matches its own node ID.

The comparison of costs among the most recently visited five nodes allows for pruning of up to 23 paths between node ID1 (from the received message) and the current node. Various embodiments may use different processing depths. A minimum depth of three nodes is required for pruning travel paths. If the depth of nodes in the received messages in more than 5, the processing resources of the Node Processor grow rapidly, by (depth−1)! The optimum depth may vary based on different problem constraints.

Both the Message Handler and the Stop Processor see this message on the Administration Bus. The Message Handler and Stop Processor work together to update the pointer if needed and then the Message Handler inserts the updated message in rank-ordered sequence with other messages in its stack of messages.

The Message Handler does not place any messages on the Node Bus until all Node Processors have sent any messages they need to send to the Message Handler via the Administration Bus as indicated by the toggle counter. When the Message Handler's toggle counter accumulates up to the count of nodes in the graph of all nodes, the Message Handler knows that all Node Processors have provided whatever messages they have based on the last message placed on the Node Bus. After a final check with the Stop Processor for a pointer update (discussed below) the next message is placed on the Node Bus by the Message Handler.

The creation of new messages by Node Processors are caused by prior messages received from the Node Bus. Unless terminated (pruned), each message iteratively moves between Node Processors and the Message Handler while its travel cost and node mask evolve. The Stop Processor keeps checking for complete node masks, but during processing keeps creating new pointers to new travel paths as required. For example, there may be an existing pointer "X" to a path BCDEF stored on the Stop Processor. The Stop Processor then sees a message on the Administration Bus that includes pointer X. The message also has a new node ID added, such as . . . CDEFT. The Stop Processor compares the last node ID of pointer X (stored on the Stop Processor) with the second to last node ID of the message . . . CDEFT. If they are the same, then the current message contains the first extension beyond path . . . BCDEF. If T is the first extension beyond . . . BCDEF, then the updated path can continue to use pointer X whose path sequence will be appended with T, stored on the Stop Processor. In this case, there is no need for the Stop Processor to inform the Message Handler to update the pointer and the Message Handler can simply insert the message into its stack for eventual placement on the Node Bus. Suppose another message is obtained with the same pointer X, but for path . . . CDEFM. This means that a single message placed on the Node Bus caused more than one Node Processor to generate a new message. Since the last node ID of pointer X (which is now T) is not the same as the second to last node ID in the new message (which is F), the Stop Processor can generate a new pointer, copy pointer X to it and correct the last visited node, removing T and appending M. Then the Stop Processor must inform the Message Handler via the Pointer Bus that the pointer in this message must be updated. Before the Message Handler places any message on the Node Bus, it must either get a message from the Stop Processor indicating either "no pointer update" or "pointer update". This is required to ensure a message doesn't get placed on the Node Bus with the wrong pointer.

The path processing can progress only as fast as the Message Handler places messages on the Node Bus which has a maximum communication bandwidth. Similarly, the Message Handler can place messages onto any one of several Node Buses to increase maximum handling speed. If this architecture is used, it is imperative for every Node Processor to be able to simultaneously listen to every Node Bus. When the Message Handler has no remaining messages in its message stacks, it sends a "no more messages" message on the Node Bus. With this message, the Node Processors can stop all processing. When the Stop Processor hears this message, it can deliver to the Administration Bus the best current path information (cost and node visitation sequence). The node visitation sequence is retrieved from memory on the Stop Processor using the pointer associated with the message demonstrating the lowest complete total path cost, being the target path.

Figure 2N:
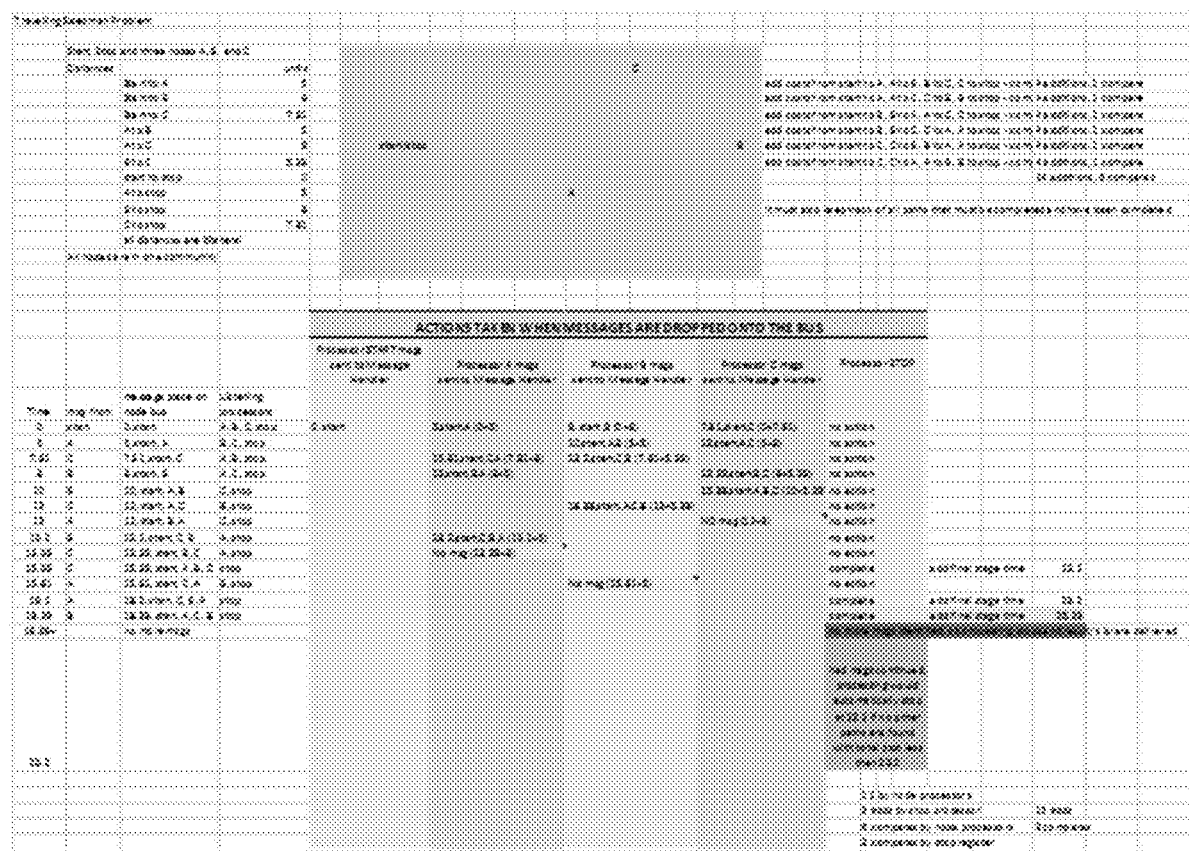

FIG. 2N shows an example of three nodes between the Start Node and the Stop Node in the traveling salesman problem. The locations of nodes are depicted in the shaded area along with the computed distances between them. Below the shaded area, is shown what each processor is doing after the initial start message is sent. Because there are no neighbor constraints specified, each Node Processor must respond to messages originating from all nodes, add an increment of travel time and then submit the new message to the Message Handler. For this example, the updates of node masks and pointers are omitted for simplicity. The Message Handler deposits the messages onto the Node Bus in increasing temporal order where they can be further processed by more Node Processors. Three shaded cells in the spreadsheet, show where Node Processors detects that a prior node path with exactly the same node visits has a shorter time than a prior observation, so no message is sent to the Message Handler. This is the pruning action described above.

The Stop Processor takes no action until it sees a full complement of visited nodes. Even then it must add-in the time from the last visited node to the location of Stop Node. Even if a first complete node mask is observed, there is still a possibility that another complete message, arriving later, could have a lower total oath time if it has a lower final time to the Stop Node. Therefore, the Stop Processor must wait for one of two things to occur to be certain there are no shorter complete solutions. Either the Message Handler must announce that there are no more messages to inspect (in which case the Stop Processor uses its current shortest complete path) or the Stop Processor waits for the Message Handler to place a message onto the Node Bus having a time greater than that of the current shortest complete path (in which case it also delivers the current shortest complete path). For this second case, if the Stop Processor were to add any non-zero time to the time (or cost) in the received message for the final travel to the Stop Node, the time or cost could only increase. If the time or cost is already higher than that of the shortest current complete path, then it is not possible to have any subsequent complete solutions with lower time or cost. Either way, it is not possible for there to be a shorter path once one of these two events has occurred. This is due to the temporal flow characteristic of the apparatus. In this simple example, only three paths have been pruned and yet the total number of additions and comparisons have been reduced. Using classical solution methods, finding the shortest path requires 24 additions and 6 comparisons. This simplified example requires 15 additions and 9 comparisons. The savings in computation increase rapidly as the number of nodes increases.

Figure 2O:
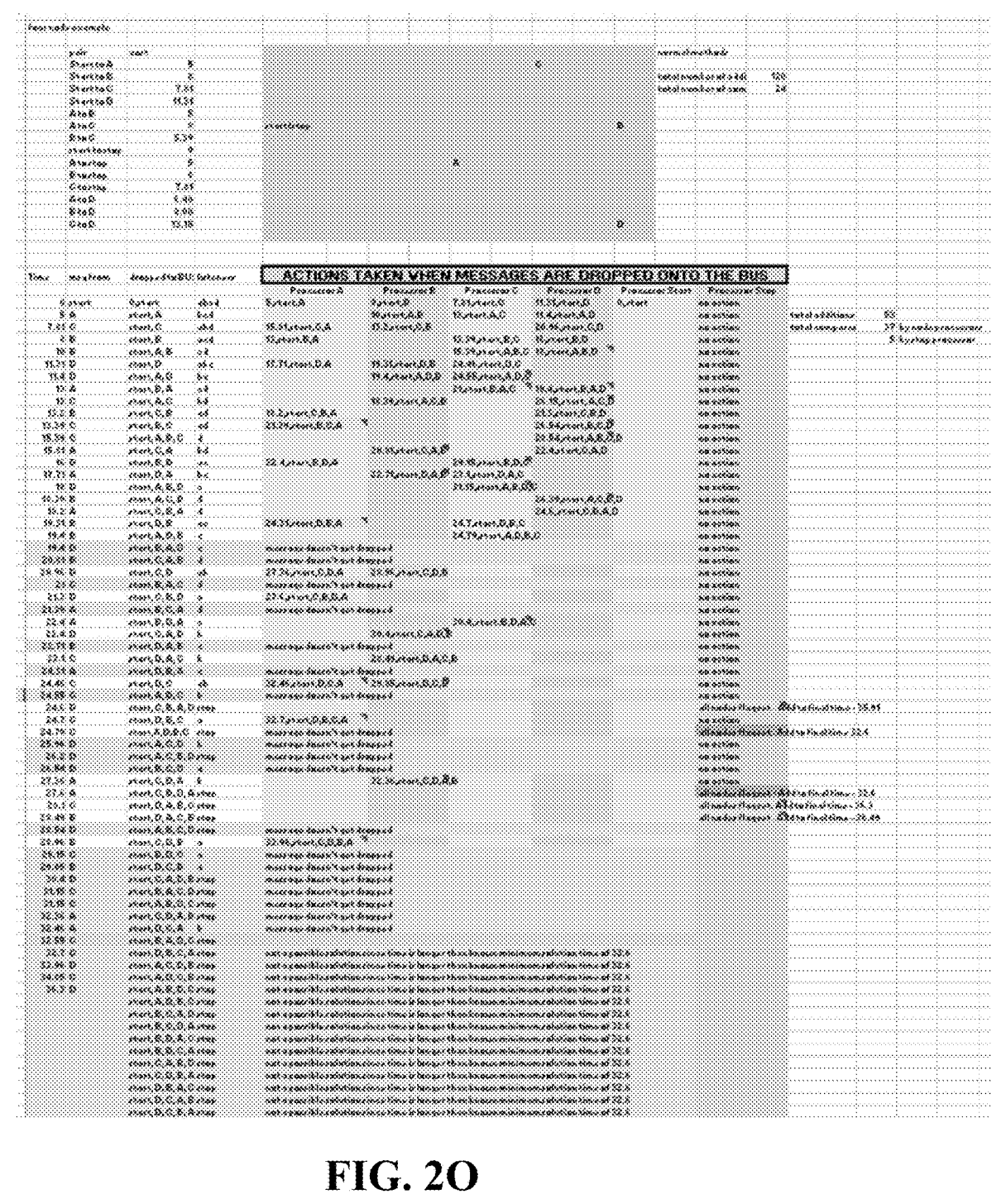

The example in FIG. 2O shows what happens with four nodes between the Start Node and the Stop Node. Following the same methodology, one can see that the number of shaded cells (indicating a shorter path has been observed by a Node Processor and to not send a message) has increased greatly. The larger group of nodes grows the complexity, but the number of branches being pruned is also growing quickly. All of the rows with shaded cells on the far left would not normally exist, due to message termination (pruning), when the embodiment is executing. They are only shown to indicate processing that can never occur because the message on the far left cannot be placed onto the Node Bus by the Message Handler. The shaded cells with text in the processor columns do have to be computed and compared with prior messages in order to assert that the message is not to be sent to the Message Handler, so there is a Node Processor processing cost to these, but not a bandwidth or subsequent computational cost. In this example, there is a first instance of a complete message at t=24.6, but once the time going from the last node to the Stop Node is included, the final time is 35.91. This cannot be declared the lowest time solution until either the Message Handler either declares no more messages in its stack or the time present in any subsequent message on the message bus exceeds 35.91, and no other complete path with total time less than 35.91 is found. Almost immediately after finding the first complete path, we show another complete path at t=25.79 having a final time (including time for the final travel leg to the Stop Node) of 32.6 which eventually turns out to be the lowest complete path time. At time 32.6, no more messages have been observed with complete visitation paths, so the Stop Processor sends a "stop processing" command on the Node Bus. The Administration Processor then receives a message from the Stop Processor which includes the final time and node visitation sequence for the target path.

The computation cost of this four-node example again shows the benefit of the apparatus. Classical methods take 24 compares and 120 additions while this embodiment accomplishes the job in 42 compares and 53 additions. The historical method for a five node embodiment requires 120 compares and 720 additions where this embodiment finds the result in 143 compares and 168 additions. With more nodes, the gap in computation cost diverges exponentially from the classical methods. Just to see how the problem normally grows as adding nodes 6, 7, and 8 . . . total compares increases to 720, 5040, and 40320 while count of additions increases to 5040, 40320, and 362880 respectively. When considering problems with hundreds or thousands of nodes, the quantity of required calculations rapidly exceeds worldwide computational resources. Since the number of possible paths increases by n! assume having a 1000 node problem requiring a large data center of servers to solve the problem within time T. If the size of the problem increases by just one node, there is then need 1001 data centers to solve the problem. Just one more node might require more data centers than are available in the world. If prune 119 out of every 120 paths are pruned (looking at the last five nodes) and such pruning occurs at every Node Processor at every step of processing, the total requirement for processing is reduced drastically.

There are many practical applications for the embodiments described herein that can use the ability to terminate processing shortly after a first solution is found, the ability to vigorously prune calculation branches with crowd processing, and use scalable, high bandwidth communication buses. Some applications include genetic engineering, cryptography, linear programming, systems optimization, graph theoretical problems, complex systems modeling and numerical methods.

In one or more embodiments, all of the nodes (graph) in an exact traveling salesman problem can be visited by any of the other nodes, irrespective of cost, distance or time between them. It makes sense that transiting between nodes on opposite sides of the graph (the multidimensional space containing the nodes) is likely to incur a higher cost than transiting between nodes in the immediate vicinity of each other. This however is not guaranteed.

Some algorithms can group nodes within a graph having relatively close proximity to each other (closer than the average distance between all adjacent nodes in the graph). A graph of nodes may have multiple groups and neighbor relationships must be made between at least one pair of nodes where there is one node in each of two groups to be connected. Some of the difficulties in classical graph theory algorithms for determining these groups is whether the group's encompassing contour should be "round" or whether they can be encompassed by complex shapes. Constraints on the shape of a group's encompassing contour lead to even more complex theories regarding the ability to ensure "complete graph connectivity" (all nodes can be visited between starting and ending points).

One or more embodiments can include a unique mode of operation and capability to ensure complete graph connectivity. To test for complete graph connectivity, the Message Handler (knowing which node is the Start Node, as informed by the Administration Processor) drops a "start" message onto the Node Bus. This message is heard by all Node Processors connected to the bus. In this mode of operation, each node that is a neighbor (defined as having a predetermined cost of travel between nodes) of the Start Node sets its own flag, indicating it has something to report to the Message Handler. In sequence, using the node ID, each of these neighbor Node Processors reports to the Message Handler via the Administration Bus, that it is a neighbor of the node sourcing the message observed on the Node Bus (in this case, the Start Node) along with the cost between the nodes. The Message Handler is able to collect the list of all nodes which are neighbors of the Start Node. Such a list can be called a "start neighbor list." The Message Handler has previously received the full set of nodes in the graph from the Administration Processor. By subtraction the Message Handler determines which nodes are missing from "start neighbor list." For instance, if there are 112 nodes in the graph and 54 are in the "start neighbor list", then 58 nodes are "unconnected" because they are not neighbors of the Start Node. The Message Handler rank-orders the "start neighbor list" based on reported cost from lowest to highest. If complete graph connectivity has not been established (evidenced by no missing nodes), the Message Handler drops another message onto the Node Bus corresponding to the nearest (lowest cost) neighbor of the Start Node, being the first neighbor in the "start neighbor list." In this mode of operation, all nodes that have previously responded to the Message Handler are disabled and can send no more messages to the Message Handler. When this next message is dropped onto the Node Bus, any additional nodes that are neighbors of the sourcing node (on behalf of which the message is sent by the Message Handler) send their consequential messages to the Message Handler (assuming they have not been disabled). This set of responses is given a new name which is designated "start neighbor list 1" which means it is the neighbor list associated with the first node in the "start neighbor list". The Message Handler again checks for graph connectivity completeness and if not found, the Message Handler drops another message onto the Node Bus from the second member of the list "start neighbor list." Again, the Message Handler receives responses from the Node Processors and creates another list called "start neighbor list 2." Each Node Processor that provides a message to the Message Handler is disabled from subsequent processing. This process repeats using messages from "start neighbor list" until the Message Handler finds complete graph connectivity. If complete graph connectivity is not found by the end of all messages in "start neighbor list", the Message Handler has to extend the search by dropping a message onto the Node Bus corresponding to the first listed entry of "start neighbor list 1." Responses to this message create another list called "start neighbor list 1, 1." During the search process, this can be extended to "start neighbor list 1, N" where N is the number of listed neighbors in the "start neighbor list 1." Perhaps there is no path to graph completeness, irrespective of how many layers deep this process goes. Note that as processing down these many paths and sub-paths progresses, the remaining unconnected node lists get smaller. Again, this is because each time any node reports to the Message Handler, it is permanently removed from sending any more messages to the Message Handler. In another example, assume an extended node list called "start neighbor list 2, 4, 8, 2, 1, 1, 7, 9, 11." This means that the start message was sent, resulting in a list of unconnected nodes called "start neighbor list." Then a message for the second of these nodes resulted in another list call "start neighbor list 2." A message for the fourth member of that list caused a list "start neighbor list 2, 4" to be generated. The remaining sequential lists resulted from dropping the eighth, second, first, first, seventh, ninth, and eleventh entries in the resulting lists respectively. If any message is dropped onto the Node Bus by the Message Handler without any Node Processor responses, the Message Handler simply moves to the next message. If after searching all possible paths for complete graph connectivity, the Message Handler cannot find it, the Message Handler informs the Administration Processor accordingly and the Administration Processor returns a message back to a client computer system such as "error, graph connectivity incomplete." Without graph connectivity, it is not possible to find any solution to the traveling salesman problem.

With a large number of nodes, the cascading of these visited neighbor lists while testing for any complete path can become computationally expensive, but still much less than the computational cost to find the target path. In the absence of any complete path, we can avoid the computational cost of finding the target path. Recall that if there are no neighbor constraints between nodes, there cannot be any stranded islands of nodes and complete graph connectivity is guaranteed. Each subsequent response list gets smaller as the search for graph completeness progresses, so even though the total number of lists may grow rapidly, this is partially mitigated by rapidly reducing counts of unconnected nodes. Further optimization of checking complete graph connectivity may be accomplished by treating all nodes within a node group as a node cluster. A requirement of this approach is that all nodes within a node cluster must have connectivity to all other nodes in the node cluster. Any neighbor of any node within the node cluster is then considered a neighbor of the node cluster. Once this is completed, the node cluster behaves computationally like a single node with a lot of neighbors. Some embodiments can test for complete graph connectivity between nodes and nodes clusters, which requires less processing.

Once an embodiment ensures complete graph connectivity, its mode of operation changes to searching for the target path. Processing reduction/optimization using graph clusters to produce node groups cannot guarantee a "complete" solution to the traveling salesman problem, but can present an acceptable tradeoff between processing cost and exactness of the solution.

Figure 2P:
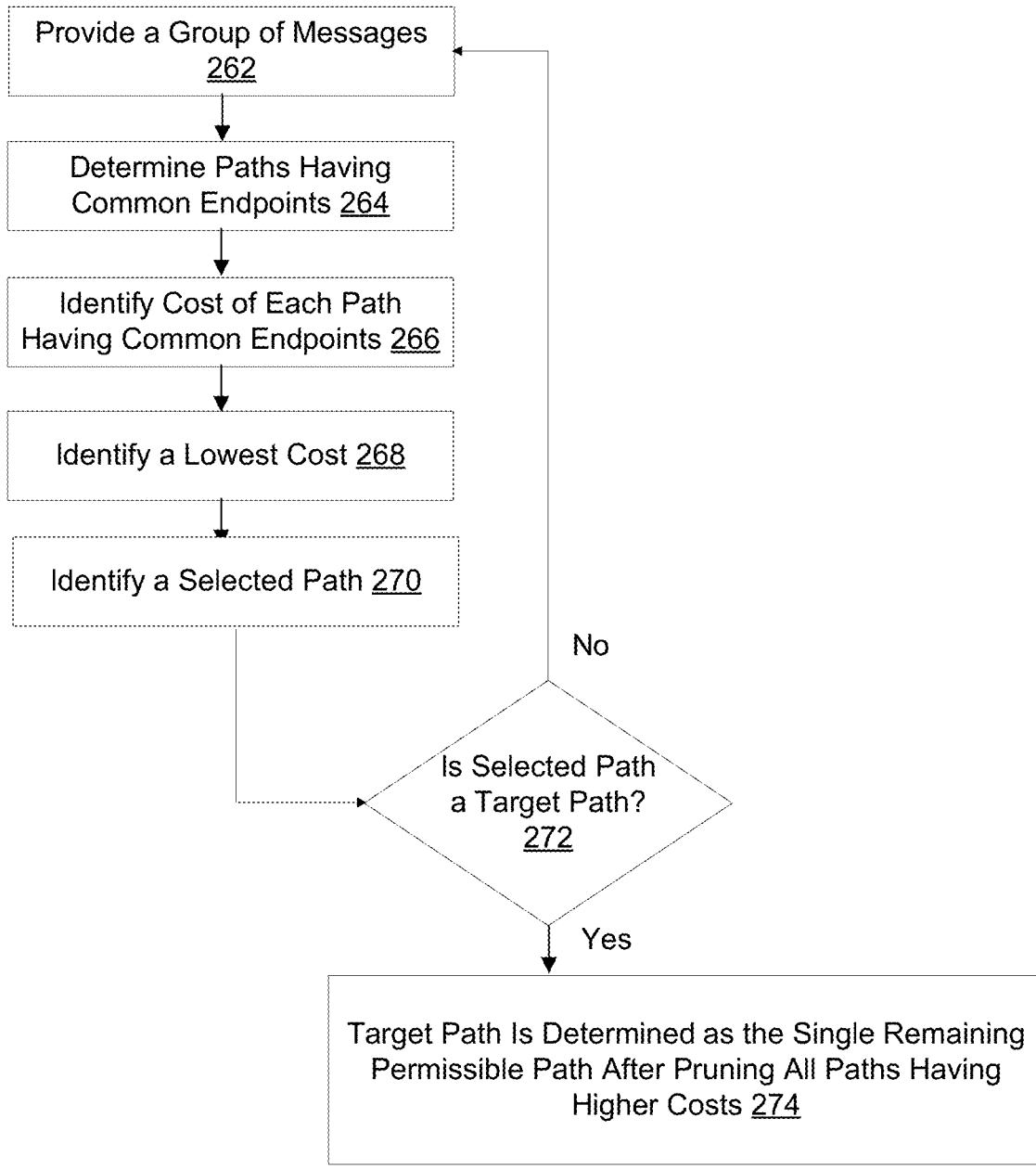
FIG. 2P depicts an illustrative embodiment of a method in accordance with various aspects described herein.

FIG. 2P depicts an illustrative embodiment of a method 260 in accordance with various aspects described herein. In one or more embodiments, the method 260 can be implemented by a server, computing device, or any other processing system. The method 260 can include iteratively providing, from a Message Handler of a processing system, messages to each of a group of Node Processors of the processing system. Each of the group of Node Processors represents a node or a group of nodes.

The method 260 can include, at 262, providing, by the Message Handler to a Node Bus, a group of first messages. Each first message includes a cost associated with a path of nodes visited by each first message. Further, the method 260 can include, at 264, determining, by each of the group of Node Processors, paths having common endpoints among a portion of the group of first messages. In addition, the method 260 can include the processing system, at 266, identifying, by each of the group of Node Processors, a cost for each of the paths having common endpoints resulting in a group of common endpoint costs. Also, the method 260, at 268, identifying, by each of the group of Node Processors, a lowest cost from among the group of common endpoint costs. Further, the method 260 can include, at 270, identifying, by each of the group of Node Processors, a selected path associated with the lowest cost. A next group of messages includes the selected path. The iteratively providing of the messages results and comparison of travel costs between paths having common endpoints, provides for pruning of a majority of paths, leaving permissible paths for continued processing. If a target path is not found, the method 260 can include the recursive processing step 272, providing a next group of messages to be processed for extension of a selected path. In addition, the method 260, determines by processing step 274, a target path which is the final permissible path after pruning of all other paths for having higher costs.

While for purposes of simplicity of explanation, the respective processes are shown and described as a series of blocks in FIG. 2O, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, the target path will be a complete path, a complete shortest path, and/or a most efficient path. If every node in the graph of nodes is permitted to be a neighbor of every other node, then the target path will also provide an exact solution, otherwise it will provide an approximate solution. The pruning of paths allows the processing system to only use the remaining paths to find/calculate the target path and forego using terminated/pruned paths to find/calculate the target path, thereby improving the efficiency in finding/calculating the target path by the processing system.

In one or more embodiments, the lowest cost of a path is associated with a first path from the common paths. Further, in method 260, identifying the lowest cost from among the costs of a group of paths having common endpoints can comprise identifying a next higher cost from among these costs. The next higher cost is associated with a second path from the common paths, comparing the lowest cost to the next higher cost, and determining the lowest cost is lower than the next highest cost. The cost of any path can be one of time, distance, available bandwidth, latency, or throughput.

In one or more embodiments, a method can comprise a processing system obtaining, by a Message Handler of a processing system, an initiation message, wherein the initiation message identifies an initial cost and a Start Node visited. Further, the method can comprise the processing system providing, by the Message Handler, the initiation message on a communication bus of the processing system, In addition, the method can comprise the processing system receiving, by the Message Handler, a first group of messages from a group of computing threads that each represent a different one of a group of nodes. Each of the first group of messages includes first costs and first nodes visited. Each of the first costs and each of the first nodes visited are associated with a corresponding one of the group of nodes. The receiving of the first group of messages is responsive to the providing of the initiation message on the communication bus. Also, the method can include the processing system providing, by the Message Handler, the first group of messages on the communication bus according to a first order that is based on the first costs. Further, the method can include the processing system receiving, by the Message Handler, a second group of messages from a first subset of the group of computing threads. Each of the second group of messages includes second costs and second nodes visited. Each of the second costs and each of the second nodes visited are associated with a corresponding one of the first subset of the group of nodes. The receiving of the second group of messages is responsive to the providing of one of the first group of messages on the communication bus. In addition, the method can include the processing system providing, by the Message Handler, the second group of messages on the communication bus according to a second order that is based on the second costs. Also, the method can include the processing system receiving, by the Message Handler, a third group of messages from a second subset of the group of threads. Each of the third group of messages includes third costs and third nodes visited. Each of the third costs and each of the third nodes visited are associated with a corresponding one of the second subset of the group of nodes. The receiving of the third group of messages is responsive to the providing of one of the second group of messages on the communication bus. Further, the method can include the processing system providing, by the Message Handler, the third group of messages on the communication bus according to a third order that is based on the third costs. At least one of the group of computing threads determines a lower cost associated with the third nodes visited and does not generate a message that is part of the third group of messages based on the lower cost being determined. The method can include the processing system stopping a message being placed on the communication bus if the cost associated with the message is greater than a total cost for another message that indicates all of the same nodes have been visited with the same common endpoints. The group of computing threads can be part of the processing system. The Message Handler and group of computing threads can be part of a distributed computing environment.

FIGS. 2Q-2U are block diagrams and associated paths illustrating an example, non-limiting embodiment of a system functioning within the communication network of FIG. 1 in accordance with various aspects described herein.

Figure 2Q:
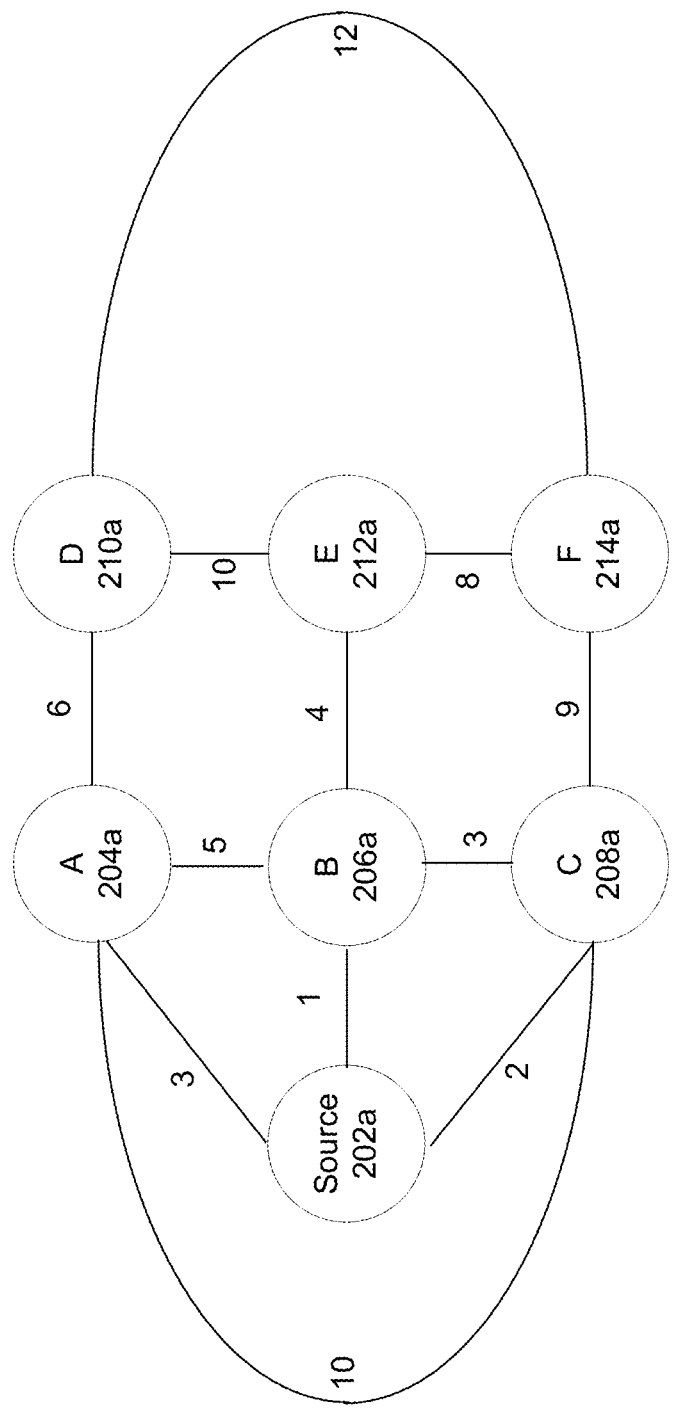

Referring to FIG. 2Q, in one or embodiments, FIG. 2Q illustrates a concept of pruning paths in calculating a target path (that can be a path that traverses each and every node i.e., complete path or a path that traverses each and every node with the lowest cost i.e., complete shortest path). Pruning can include discarding intermediate paths that may be costlier than less costly intermediate paths. The system 200a comprises group of nodes 202a-218a (i.e. network of nodes) that can include a source node 202a, all of which are interconnected to each other with links. Each link can be associated with a cost. In further embodiments, the group of nodes 202a-218b may be processors (i.e., Node Processors) in a computing/processing environment including a cloud computing environment and/or virtual computing environment. In additional embodiments, the group of nodes 202a-218a may be network elements in a communication network. The group of nodes 202a-218a can be a network of nodes or a collection of nodes each of which implement functions (some of which may be the same).

In one or more embodiments, each node can be a Node Processor within a computing environment. Any Node Processor can receive a message originating from another Node Processor and having an accumulated cost from the totality of node travels up to the other node which originates the message. The current Node Processor adds to the prior accumulated cost, the cost of travel between the node originating the message and the current node. Further, the Node Processor may request a Message Handler to drop a message onto a communication bus of the computing environment, receivable by other Node Processors in the computing environment. In this embodiment, Node Processors do not directly communicate with one another, but instead via a Message Handler that coordinates message flows on a common communication bus. For example, node A 204a can receive several messages. A first message can be received directly from the source node A 204a at a cost of 3. In response to receiving the first message, node A 204a can forward a message to a communication bus that is received by node B 206a with accumulated cost of 8 and node D 210a with accumulated cost of 9, and forward a message to the communication bus that is received by node C 208a with accumulated cost of 13. A second message received by node A 204a can be from the source node 202 through node B 206a at an accumulated cost of 6. In response to receiving the second message, node A 204a can provide a message to node D 210a with cost 12 and provide another message to node C 208a with an accumulated cost 16. Note, no message is sent from node A 204a to the source node 202a or to node B 206a, as message son the path already visited these nodes. The message traveling between nodes carries a history of node visitations and the source node 202a, being part of the travel history.

In one or more embodiments, two different types of methods can be used to compute a target path traversing each and every node in system 200a, which are related to each other. One method can be called the greedy path method while the other method can be called the cost statistics and sequestration method. Both are iterative methods in which each iteration computes the cost of partial paths of a target path and determines the known minimum solution (KMS) for each iteration, which is the partial path having the least cost for a particular iteration (Note, in one or more embodiments, the KMS can take into account some other criterion/factor/variable and may not be the minimum cost solution but rather the lowest solution that satisfies the other criterion/factor/variable, which may end up being the second or third lowest cost solution overall without considering the other criterion/factor/variable, for example). Both iterative methods attempt to balance of finding a low-cost target path with the number of calculations needed to find such a low-cost path. As the number of nodes linearly increase in systems 200a, the number of calculations to find a low-cost target path exponentially increase. Users of the method to find low-cost target paths may have processing constraints that limit the number of calculations a system can perform. Thus, the iterative methods such as the greedy path method and the cost statistics and sequestration method strike a balance in finding a low-cost target path in view of processing constraints.

Referring to FIG. 2R, in one or more embodiments, implementing the greedy path method, in a first iteration, the source node 202a sends a message to each of node A 204a, node B 206a, and node C, 208a resulting in the following associated paths/costs: S-A=3; S-B=1; and S-C=2. Based on these paths and their associated costs, the KMS=1 for the path S-B. In the second iteration, paths S-A and S-C are discarded (i.e., further messages are not sent along paths S-A and S-C because they have costs that are higher than the KMS), but messages are sent along path S-B resulting the following associated paths/costs: S-B-A=6, S-B-C=4, and S-B-E=5. Based on these paths and their associated costs, the KMS=4. In the third iteration, paths S-B-E and S-B-A are discarded, and messages are sent along path S-B-C resulting in the following associated paths/costs: S-B-C-

A=14; and S-B-C-F=13. Based on these paths and their associated costs, the KMS=13 for the path S-B-C-F. In the fourth iteration, path S-B-C-A is discarded, and messages are sent along path S-B-C-F resulting in the following associated paths/costs: S-B-C-F-E=21 and S-B-C-F-D=25. Based on these paths and their associated costs, the KMS=21. In the fifth iteration, the path S-B-C-F-D is discarded, and messages are sent along the path S-B-C-F-E resulting in the following associated path/cost, S-B-C-F-E-D=31. Based on this path and its associated cost, the KMS=31 for the path S-B-C-F-E-D=31. In the sixth iteration, messages are sent along path S-B-C-F-E-D resulting in the following associated path/cost, S-B-C-F-E-D-A=37. This path traverses each and every node in system 200a and hence can be designated as a target path. However, the cost of this target path may not be lower than utilizing the cost statistics and sequestration method.

Referring to FIG. 2S, in one or more embodiments, implementing the cost statistics and sequestration method, the cost statistics for the network shown in system 200a include the average cost=5.3 and the standard deviation=2.7. Based on the KMS and the cost statistics, some paths with costs above a standard deviation can be sequestered to a sequestration handler (e.g., a separate processor in system 200a, similar in function to the message handler) to be calculated later, if need be to find a path with a lower cost that traverses each node. In a first iteration, a message can be sent from the source node to each of the adjacent nodes node A 204a, node B 206a, and node C 208a resulting in the following associated paths/costs: S-A=3; S-B=1; and S-C=2. Based on these paths and their associated costs, the KMS=1. Further, the cost of each path is within the average cost (5.3) such that in a second iteration, no paths are sequestered and messages are sent along paths S-A, S-B, and S-C, resulting in the following associated paths/costs: S-B-A=6; S-B-C=4; S-B-E=5; S-C-A=12; S-C-B=5; S-C-F=11; S-A-B=8; S-A-C=13; and S-A-D=9. Based on these paths and their associated costs, the KMS=4 associated with path S-B-C. Further, the cost associated with path S-B=1, and with average cost=5.3 and standard deviation=2.7, any path with an associated cost in the second iteration greater than 9 (average cost (5.3) in addition to one standard deviation (2.7)) in addition to the KMS) can be sequestered, resulting in paths S-C-A, S-C-F, and S-A-C being sequestered. These paths are sequestered because it is unlikely than any paths S-C-A, S-C-F, and S-A-C would result in being a target path with a lower cost than a target path that includes S-B-C, S-B-E, S-C-B, S-B-A, S-A-B, and S-A-D based on the cost statistics (e.g., average cost and standard deviation). The cost associated with paths S-C-A=12 and S-C-F=11 is between one standard deviation and two standard deviations such that they are sequestered in a first sequestration bucket. The cost associated with path S-A-C=13 is between two standard deviations and three standard deviations such that it is sequestered in a second sequestration bucket. In a third iteration, messages are sent along paths S-B-C, S-B-E, S-C-B, S-B-A, S-A-B, and S-A-D, resulting in the following associated paths/costs: S-B-C-A=14, S-B-C-F=13, S-B-E-D=15, S-B-E-F=13, S-C-B-A=10, S-C-B-E=9, S-B-A-C=16, S-B-A-D=12, S-A-B-C=11, S-A-B-E=12, S-A-D-E=19, and S-A-D-F=21. Based on these paths and their associated costs, the KMS=9 associated with path S-C-B-E. Further, the cost associated with path S-B-C=4, and with average cost=5.3 and standard deviation=2.7, any path with an associated cost in the third iteration greater than 12 (average cost (5.3) in addition to one standard deviation (2.7) in addition to the KMS) can be sequestered, resulting in paths S-B-C-A, S-B-C-F, S-B-E-D, S-B-E-F, S-B-A-C, S-A-D-E, S-A-D-F being sequestered. The cost associated with paths S-B-C-A=14, S-B-C-F=13, S-B-E-D=15, S-B-E-F=13 is between one standard deviation and two standard deviation such that they are sequestered in the first sequestration bucket. The cost associated with path S-B-A-C=16 is between two standard deviations and three standard deviations such that it is sequestered in a second sequestration bucket. The cost associated with path S-A-D-E=19 is between three standard deviations and four standard deviations such that it is sequestered in a third sequestration bucket. The cost associated with path S-A-D-F=21 is between four standard deviations and five standard deviations such that it is sequestered in a fourth sequestration bucket. In a fourth iteration, messages are sent along paths S-C-B-E, S-C-B-A, S-A-B-C, S-B-A-D, S-A-B-E, resulting in the following associated paths/costs: S-C-B-E-D=19, S-C-B-E-F=17, S-C-B-A-D=16, S-A-B-C-F=20, S-B-A-D-E=22, S-B-A-D-F=24, S-A-B-E-D=22, and S-A-B-E-F=20. Based on these paths and their associated costs, the KMS=16 associated with path S-C-B-A-D. Further, the cost associated with path S-C-B-E=9, and with average cost=5.3 and standard deviation=2.7, any path with an associated cost in the fourth iteration greater than 17 (average cost (5.3) in addition to one standard deviation (2.7) in addition to the KMS) can be sequestered, resulting in paths S-C-B-E-D, S-A-B-C-F, S-B-A-D-E, S-B-A-D-F, S-A-B-E-D, S-A-B-E-F being sequestered. The cost associated with paths S-C-B-E-D=19, S-A-B-C-F=20, and S-A-B-E-F=20 is between one standard deviation and two standard deviations such that they are sequestered in the first sequestration bucket. The cost associated with paths S-B-A-D-E and S-A-B-E-D are between two standard deviations and three standard deviations such that they are sequestered in a second sequestration bucket. The cost associated with path S-B-A-D-F=24 is between three standard deviations and four standard deviations such that they are sequestered in a third sequestration bucket. In a fifth iteration, messages are sent along paths S-C-B-A-D, and S-C-B-E-F, resulting in the following associated paths/costs: S-C-B-A-D-E=26, S-C-B-A-D-F=28, and S-C-B-E-F-D=29. Based on these paths and their associated costs, the KMS=26 associated with path S-C-B-A-D-E. Further, the cost associated with path S-C-B-A-D=16, and with average cost=5.3 and standard deviation=2.7, any path with an associated cost in the fifth iteration greater than 24 (average cost (5.3) in addition to one standard deviation (2.7) in addition to the KMS) can be sequestered, resulting in paths S-C-B-A-D-F and S-C-D-E-F-D being sequestered. The cost associated with paths S-C-B-A-D-F=28 and S-C-D-E-F-D=29 is within two standard deviations and three standard deviations such that it is sequestered in the second sequestration bucket. In a sixth iteration, messages are sent along path S-C-B-A-D-E, resulting in the following associated path/cost: S-C-B-A-D-E-F=34. The path S-C-B-A-D-E-F has traversed each and every node in system 200a such the calculation of a target path has been determined. The target path is S-C-B-A-D-E-F and is associated with a cost of 34.

Referring to FIG. 2R and FIG. 2S, in one or more embodiments, comparing the cost of the target path determined in FIG. 2R utilizing the greedy path method (37) with the cost of the target path determined in FIG. 2S utilizing the cost statistics and sequestration method (34) shows the cost statistics and sequestration method allows a target path with a lower cost to be determined. However, the greedy path method reveals a cost of the target path that is close to the cost of the target path determined by the cost statistics and sequestration method but computes less calculations (e.g., 12 calculations utilizing the greedy path method compared to 36 calculations utilizing the cost statistics and sequestration method). A user can determine whether it is worth the higher number of calculations, 36 vs. 12, to achieve the lower cost, 34 vs. 37.

Figure 2T:
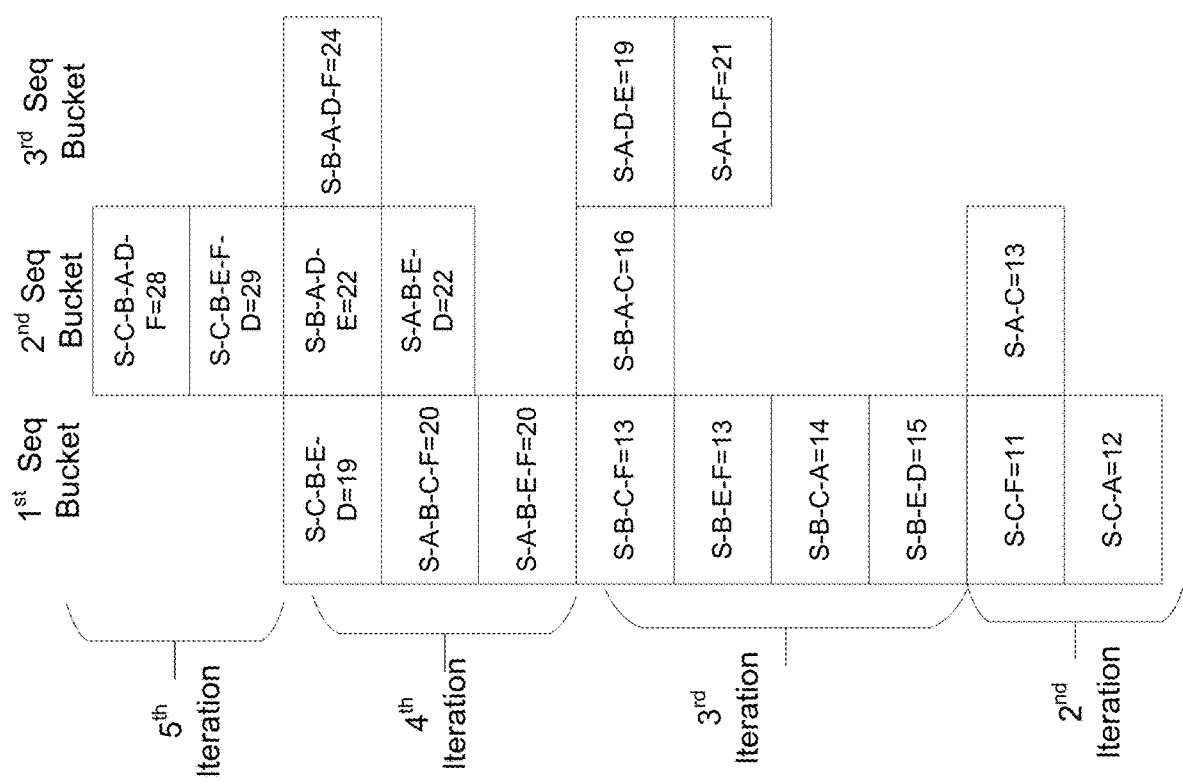

Referring to FIG. 2T, in one or more embodiments, paths that have been sequestered during the iterative cost statistics and sequestration method associated with FIG. 2S are shown. Referring to FIG. 2U, in some embodiments, the cost statistics and sequestration method can continue by computing target paths for the sequestered paths. The cost statistics and sequestration method can continue by first calculating costs target paths of paths sequestered from the most recent iteration and with the lowest ranked bucket. Paths that are sequestered most recently may be more likely to lead to finding a target path that has a lower cost than the target path found in FIG. 2S. Thus, FIG. 2U illustrates first calculating target paths for the second sequestration bucket from the fifth iteration. In the sixth iteration, the resulting paths/costs are: S-C-B-A-D-F-E=36; and S-C-B-E-F-D-A=35. These paths can be target paths as each path traverses each and every node in system 200a.

In one or more embodiments, the cost statistics and sequestration method can continue to the next sequestration bucket within the iteration, if any, or continue to the lowest sequestration bucket in the previous iteration. Thus, the target path to be calculated are the paths sequestered from the first sequestration bucket from the fourth iteration. In the fifth iteration, the resulting paths/costs are: S-C-B-E-D-A=25; S-C-B-E-D-F=31; S-A-B-C-F-D=32; S-A-B-C-F-E=28; S-A-B-E-F-C=29; and S-A-B-E-F-D=32. Based on these paths/costs, in the sixth iteration the resulting paths/costs are: S-A-B-C-F-E-D=38; and S-A-B-C-F-C-E=39. Note, that there can be other paths such as S-C-B-E-D-F-C, however, the path traverses a node twice (node C 208a) before reaching a node it has yet to traverse (node A 204a) and is not included in the chart 235a.

In one or more embodiments, the resulting costs of the target paths, S-C-B-A-D-F-E=36, S-C-B-E-F-D-A=35, S-A-B-C-F-E-D=38, and S-A-B-C-F-C-E=39 are more than the cost found of the target path calculated in FIG. 2S, S-C-B-A-D-E-F=34. Based on the costs of the resulting target paths that traverse each and every node of system 200a, further target paths can be calculated from the paths in the sequestration buckets. Users of the cost statistics and sequestration method can balance the trade-off between implementing more calculations (e.g., processing power) with the current lowest cost of a target path to determine whether it is worth expending further processing power in calculating target paths from the paths in the sequestration bucket with the hope to finding a new target path with a lower cost than S-C-B-A-D-E-F=34. As can be seen in chart 235a, the costs of target paths found from the sequestered paths that include S-C-B-E-F-D-A=35, S-C-B-A-D-F-E=36, S-A-B-C-F-E-D=38, and S-A-B-C-F-D-E=42, all of have costs higher than the target path found in FIG. 2S, S-C-B-A-D-E-F=34.

Figure 2V:
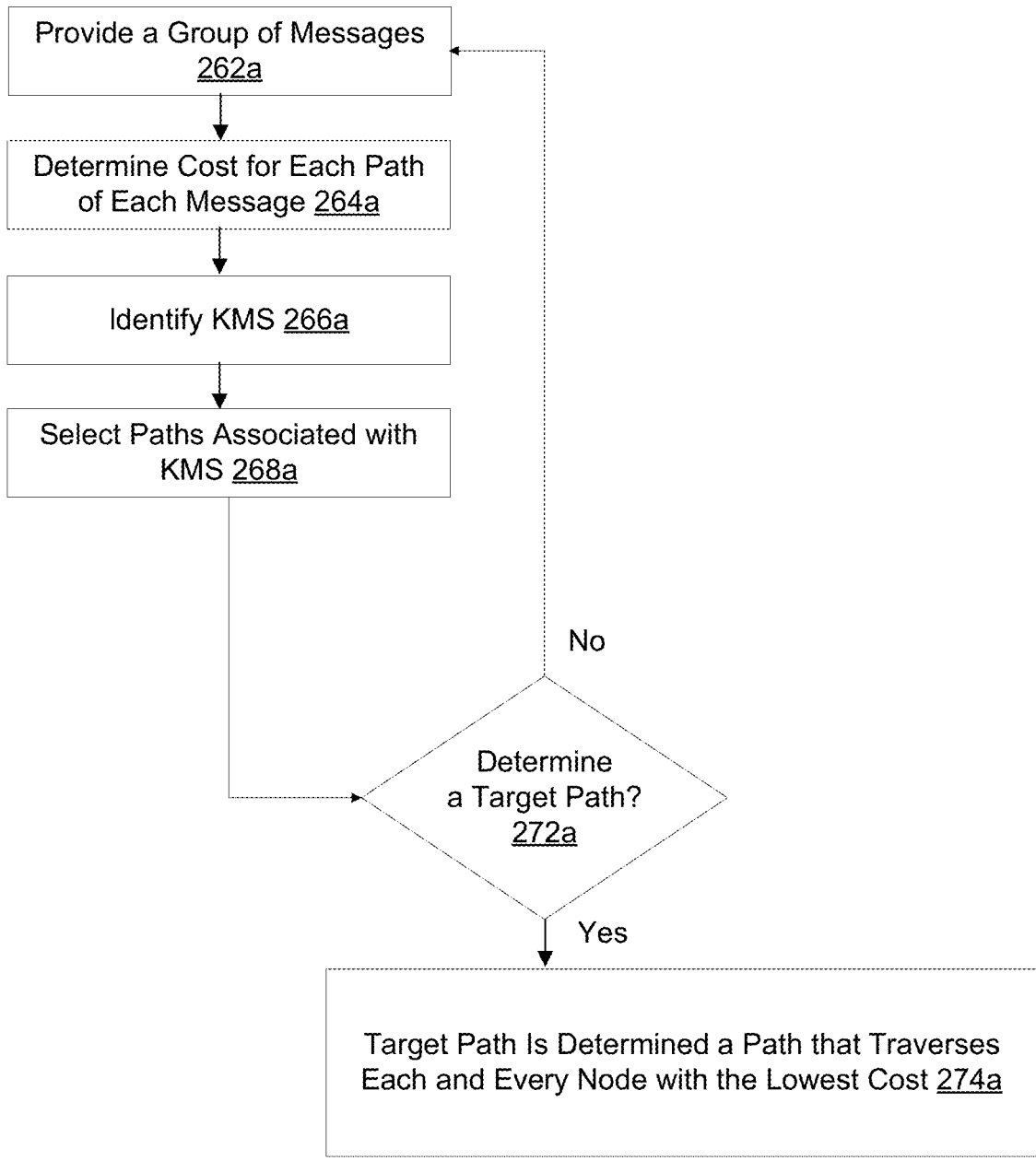
FIGS. 2V-2X depict illustrative embodiments of methods in accordance with various aspects described herein.
Figure 2W:
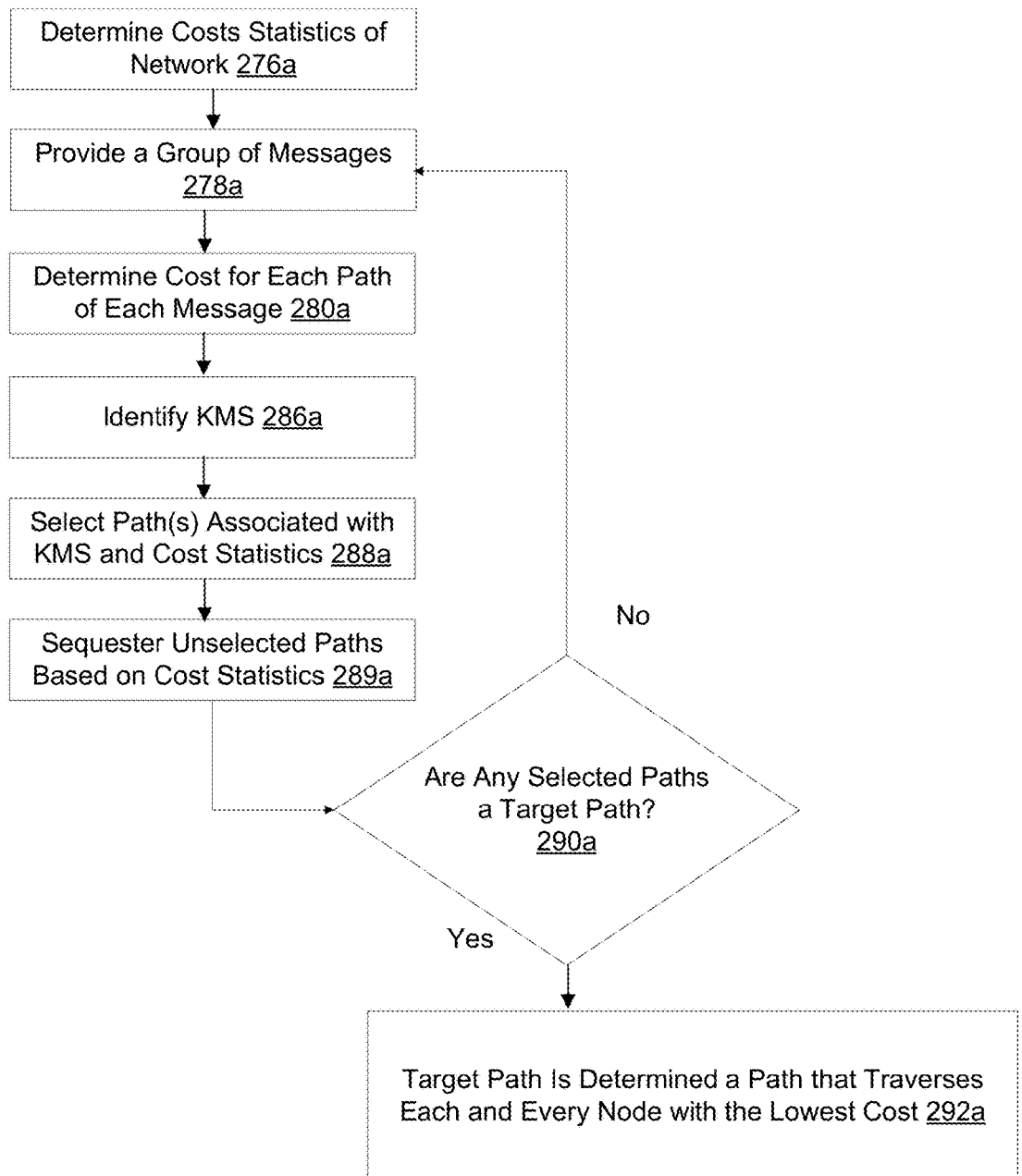
Figure 2X:
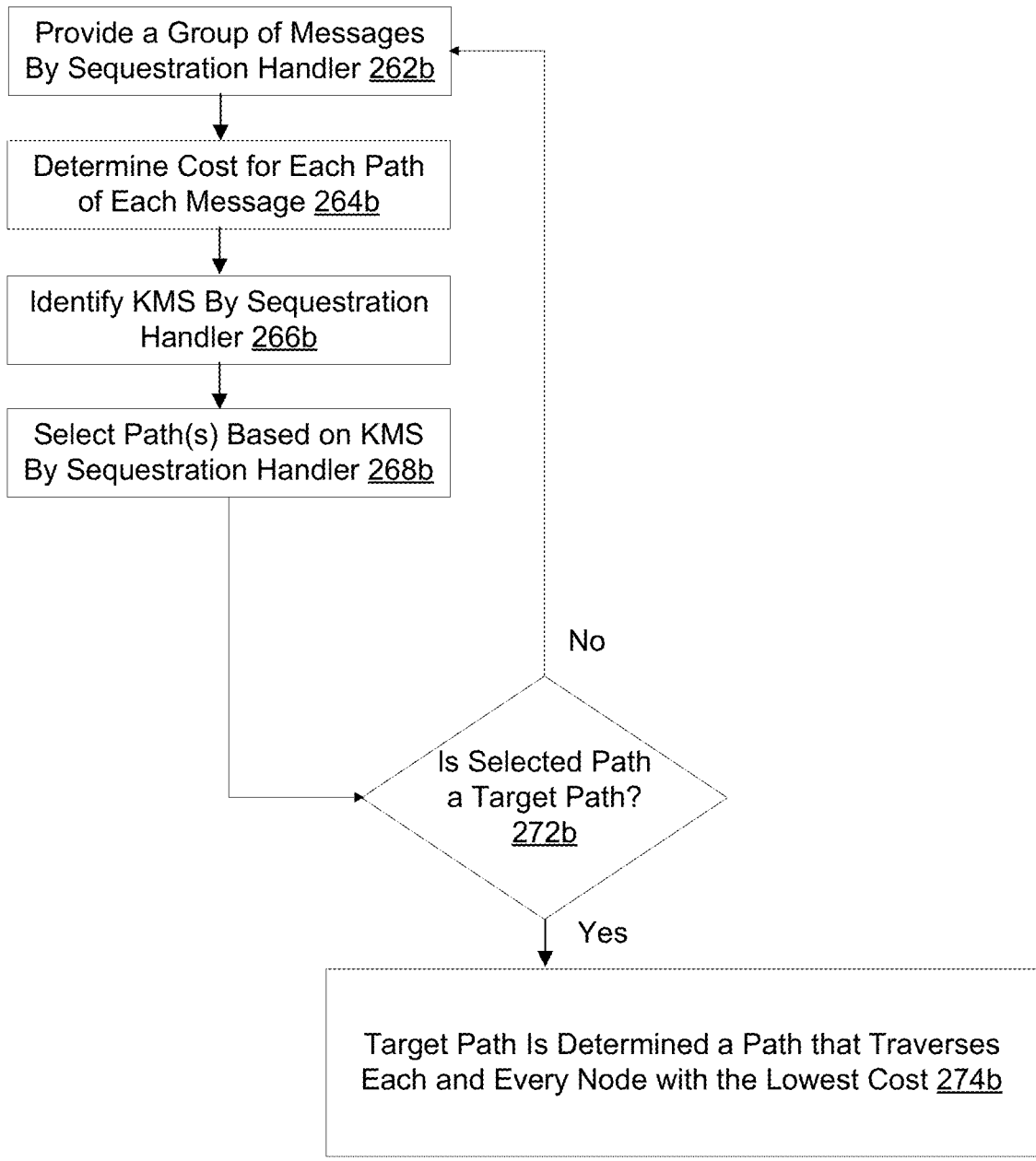

FIGS. 2V-2X depict illustrative embodiments of methods in accordance with various aspects described herein. Referring to FIG. 2Q and FIG. 2V, in one or more embodiments, method 260a can implemented by a message handler that is part of the systems 200a. The method 260a can implement aspects of the greedy path method described herein. Further, the method 260a can include the message handler, at 262a, providing a message to each of a group of node processors of system 200a resulting in a group of messages. Additionally, the method 260a can include the message handler, at 264a, determining a cost associated with a path of each message resulting in a group of costs and a group of paths. In addition, the method 260a can include the message handler, at 266a, identifying a known minimum solution (KMS), wherein the KMS is a least cost from the group of costs. Also, the method 260a can include the message handler, at 268a, selecting at least one path from the group of paths associated with the KMS resulting in at least one selected path. Further, the method 260a can include the message handler, at 272a, determining whether a selected path is a target path (a path that traverses each and every node). If a target path is not determined, then the method 260a returns to the message handler, at 262a, providing a group of next messages and the method 260a continues iteratively until a target path is determined. Once a target path is determined at 272a, the method 260a stops when the message handler determines, at 274a, the target path traverses each and every node with the lowest cost.

Referring to FIGS. 2Q and 2W, in one or more embodiments, method 275a can implemented by a message handler that is part of the systems 200a. The method 275a can implement aspects of the cost statistics and sequestration method described herein. Further, the method 275a can include the message handler, at 276a, determining, cost statistics of the nodes in system 200a, which includes determining an average cost between any two nodes of the group of nodes, and determining a standard deviation associated with the average cost. Additionally, the method 275a can include the message handler, at 278s, providing a group of messages to each of a group of node processors. In addition, the method 275a can include the message handler, at 280a, determining a cost associated with a path of each message resulting in a group of costs and a group of paths. Also, the method 275a can include the message handler, at 286a, identifying a known minimum solution (KMS). The KMS is the least cost from the group of costs. Further, the method 275a can include the message handler, at 288a, selecting at least one path from the group of paths associated with the KMS according to the average cost and the standard deviation resulting in at least one selected path. In addition, the method 275a can include the message handler, at 289a, sequestering unselected paths based on the average cost and the standard deviation (as described herein). Also, the method 275a can include the message handler, at 290a, can determine whether the any selected path is a target path (a path that traverses each and every node). If a target path is not determined, then the method 275a returns to providing, at 276a, a group of next messages and the method 260a continues iteratively until a target path is determined. Once a target path is determined at 290a, the method 292a stops when the message handler determines, at 292a, the target path traverses each and every node with the lowest cost.

Referring to FIG. 2Q and FIG. 2X, in one or more embodiments, method 265b be implemented by a user after method 275a to determine whether a lower cost target path can be found from the sequestered paths. Method 265b implements aspects of the cost statistics and sequestration method described herein. Moreover, method 265b can be implemented by one or more sequestration handlers (a processor dedicated to implementing method 265b) on paths sequestered in a most recent iteration in different sequestration buckets (e.g., first sequestration bucket are sequestered paths that have costs within one standard deviation and two standard deviations of the average cost, second sequestration bucket are sequestered paths that have costs within two standard deviations and three standard deviations of the average cost, etc.). Further, the method 265b can include a sequestration handler, at 262b, providing a group of messages to each of a group of node processors. In addition, the method 265b can include the sequestration handler, at 264b, determining a cost associated a path with each message resulting in a group of costs and a group of paths. Also, the method can include the sequestration handler, at 266b, identifying the KMS. The KMS is the least cost from the group of costs. Further, the method 265b can include the sequestration handler, at 268b, selecting at least one path from the group of paths associated with the KMS resulting in at least one selected path. Also, the method 265b can include the sequestration handler, at 272b, can determine whether the any selected path is a target path (a path that traverses each and every node). If a target path is not determined, then the method 265b returns to providing, at 262b, a group of next messages and the method 265b continues iteratively until a target path is determined. Once a target path is determined at 272b, the method 265b stops when the sequestration handler, at 274b, determines the target path traverses each and every node with the lowest cost.

One or more embodiments can include a method comprising iteratively providing, from a message handler of a processing system including a processor, a first message to each of a group of node processors of the processing system resulting in a group of first messages, wherein each of the group of node processors represents a node of a group of nodes, wherein the iteratively providing of the group of first messages comprises: determining, by the message handler, a cost associated with a path of each first message resulting in a first group of costs and a first group of paths; identifying, by the message handler, a known minimum solution (KMS), the KMS is a least cost from the first group of costs; selecting, by the message handler, at least one path from the first group of paths associated with the KMS resulting in at least one first selected path; and providing, by the message handler, a next message that includes the at least one first selected path and based on the KMS to a first portion of the group of node processors of the processing system resulting in a first group of next messages and a first plurality of selected paths The method further comprises, responsive to the iteratively providing of the group of first messages and first group of next messages, determining, by the message handler, a first target path that is a remaining path of the first plurality of selected paths, the remaining path is identified from the iteratively providing of the group of first messages and the first group of next messages, and the first target path is through each node of the group of nodes. Additionally, the method can comprise determining, by the message handler, an average cost between any two nodes of the group of nodes, and determining, by the message handler, a standard deviation associated with the average cost. Also, the method can include the selecting of the at least one path from the first group of paths comprises selecting, by the message handler, the at least one path from the first group of paths according to the average cost and the standard deviation. Further, the method can comprise identifying, by the message handler, a first portion of the first group of paths such that each of the first portion of the first group of paths is associated with a first cost that is more than the average cost and the standard deviation associated with the average cost resulting a group of sequestered selected paths and a first identification. In addition, the method can comprise providing, by the message handler, the first identification of group of sequestered paths to a sequestration handler, wherein the processing system comprises the sequestration handler.

The method can further comprise iteratively providing, from the sequestration handler, a second message to each of a second portion of a group of node processors of the processing system resulting in a group of second messages, the iteratively providing of the group of second messages comprises: determining, by the sequestration handler, a cost associated with a path of each second message resulting in a second group of costs and a second group of paths; identifying, by the sequestration handler, the known minimum solution (KMS), the KMS is a least cost from the second group of costs; selecting, by the sequestration handler, at least one path from the second group of paths associated with the KMS resulting in at least one second selected path; and providing, by the sequestration handler, a next message that includes the at least one second selected path and based on the KMS to a third portion of the group of node processors of the processing system resulting in a second group of next messages and a second plurality of selected paths. In addition, the method can comprise, responsive to the iteratively providing of the group of second messages and second group of next messages, determining, by the sequestration handler, a second target path that is a remaining path of the second plurality of selected paths, the remaining path is identified from the iteratively providing of the group of first messages and the second group of next messages, the second target path is through each node of the group of nodes. The method can include that a cost associated with the second target path is lower than a cost associated with the first target path, the first and/or second target path is a complete path, and the first and/or second target path is a complete shortest path. Further, the cost is one of time, distance, monetary cost, available bandwidth, latency, throughput, risk, or probability of success.

One or more embodiments can include a device, comprising a processing system including a processor, a group of node processors, an administration processor, and a message handler, each of the group of node processors represents a node of a group of nodes, and a memory that stores executable instructions that, when executed by the processing system, facilitates performance of operations. The operations can comprise determining, by the message handler, an average cost between any two nodes of the group of nodes, and determining, by the message handler, a standard deviation associated with the average cost. Further, the operations can comprise iteratively providing from the message handler of the processing system, a first message to each of the group of node processors resulting in a group of first messages, the iteratively providing of the group of first messages comprises: determining, by the message handler, a cost associated with a path of each first message resulting in a first group of costs and a first group of paths; identifying, by the message handler, a known minimum solution (KMS), the KMS is a least cost from the first group of costs; selecting, by the message handler, at least one path from the first group of paths associated with the KMS according to the average cost and the standard deviation resulting in at least one first selected path; and providing, by the message handler, a next message that includes the at least one first selected path and based on the KMS, the average cost, and the standard deviation to a first portion of the group of node processors of the processing system resulting in a first group of next messages and a first plurality of selected paths. In addition, the operations can comprise responsive to the iteratively providing of the group of first messages and the first group of next messages, determining, by the message handler, a first target path that is a remaining path of the first plurality of selected paths, the remaining path is identified from the iteratively providing of the group of first messages and the first group of next messages, and the first target path is through each node of the group of nodes.

The operations can further comprise identifying, by the message handler, a first portion of the group of paths such that each of the first portion of the group of paths is associated with a first cost that is more than the average cost and the standard deviation associated with the average cost resulting a group of sequestered selected paths and a first identification. Additionally, the operations can comprise providing, by the message handler, the first identification of group of sequestered paths to a sequestration handler, wherein the processing system comprises the sequestration handler.

The operations can also include iteratively providing, from the sequestration handler, a second message to each of a second portion group of node processors of the processing system resulting in a group of second messages, the iteratively providing of the group of second messages comprises: determining, by the sequestration handler, a cost associated with a path of each second message resulting in a second group of costs and a second group of paths; identifying, by the sequestration handler, the known minimum solution (KMS), the KMS is a least cost from the second group of costs; selecting, by the sequestration handler, at least one path from the second group of paths associated with the KMS resulting in at least one second selected path; and providing, by the sequestration handler, a next message that includes the at least one second selected path and based on the KMS to a third portion of the group of node processors of the processing system resulting in a second group of next messages and a second plurality of selected paths. Also the operations can comprise responsive to the iteratively providing of the group of second messages and second group of next messages, determining, by the sequestration handler, a second target path that is a remaining path of the second plurality of selected paths, the remaining path is identified from the iteratively providing of the group of first messages and the second group of next messages, and the second target path is through each node of the group of nodes. A cost associated with the second target path is lower than a cost associated with the first target path One or more embodiments can include a non-transitory, machine-readable medium, comprising executable instructions that, when executed by a processing system including a processor, a group of node processors, an administration processor, and a message handler, wherein each of the group of node processors represents a node of a group of nodes, facilitate performance of operations, the operations comprising determining, by the message handler, an average cost between any two nodes of the group of nodes, and determining, by the message handler, a standard deviation associated with the average cost. Further, the operations can comprise iteratively providing from the message handler of the processing system, a first message to each of the group of node processors resulting in a group of first messages, the iteratively providing of the group of first messages comprises: determining, by the message handler, a cost associated with a path of each first message resulting in a group of costs and a group of paths; identifying, by the message handler, a known minimum solution (KMS), wherein the KMS is a least cost from the group of costs; selecting, by the message handler, at least one path from the group of paths associated with the KMS according to the average cost and the standard deviation resulting in at least one selected path; and providing, by the message handler, a next message that includes the at least one selected path and based on the KMS, the average cost, and the standard deviation to a portion of the group of node processors of the processing system resulting in a group of next messages and a plurality of selected paths. In addition, the operations can comprise responsive to the iteratively providing of the group of first messages and the group of next messages, determining, by the message handler, a target path that is a remaining path of the plurality of selected paths, the remaining path is identified from the iteratively providing of the group of first messages and the group of next messages, and the target path is through each node of the group of nodes. The target path can be a complete path and/or a complete shortest path.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems and implement methods as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
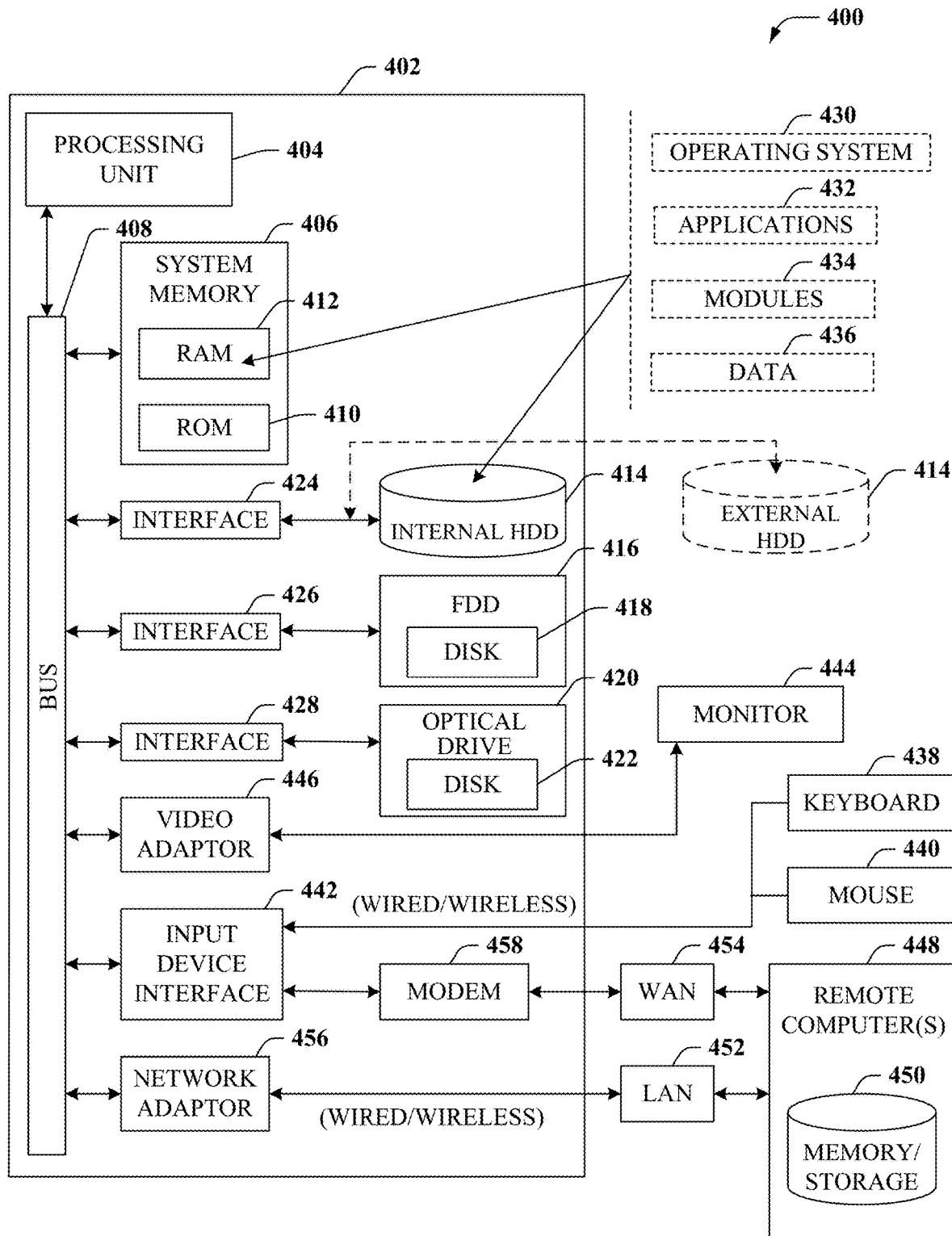
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404. The devices and nodes in system 200 in FIG. 2A and the systems in FIGS. 2H-2M can comprise computer 402.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
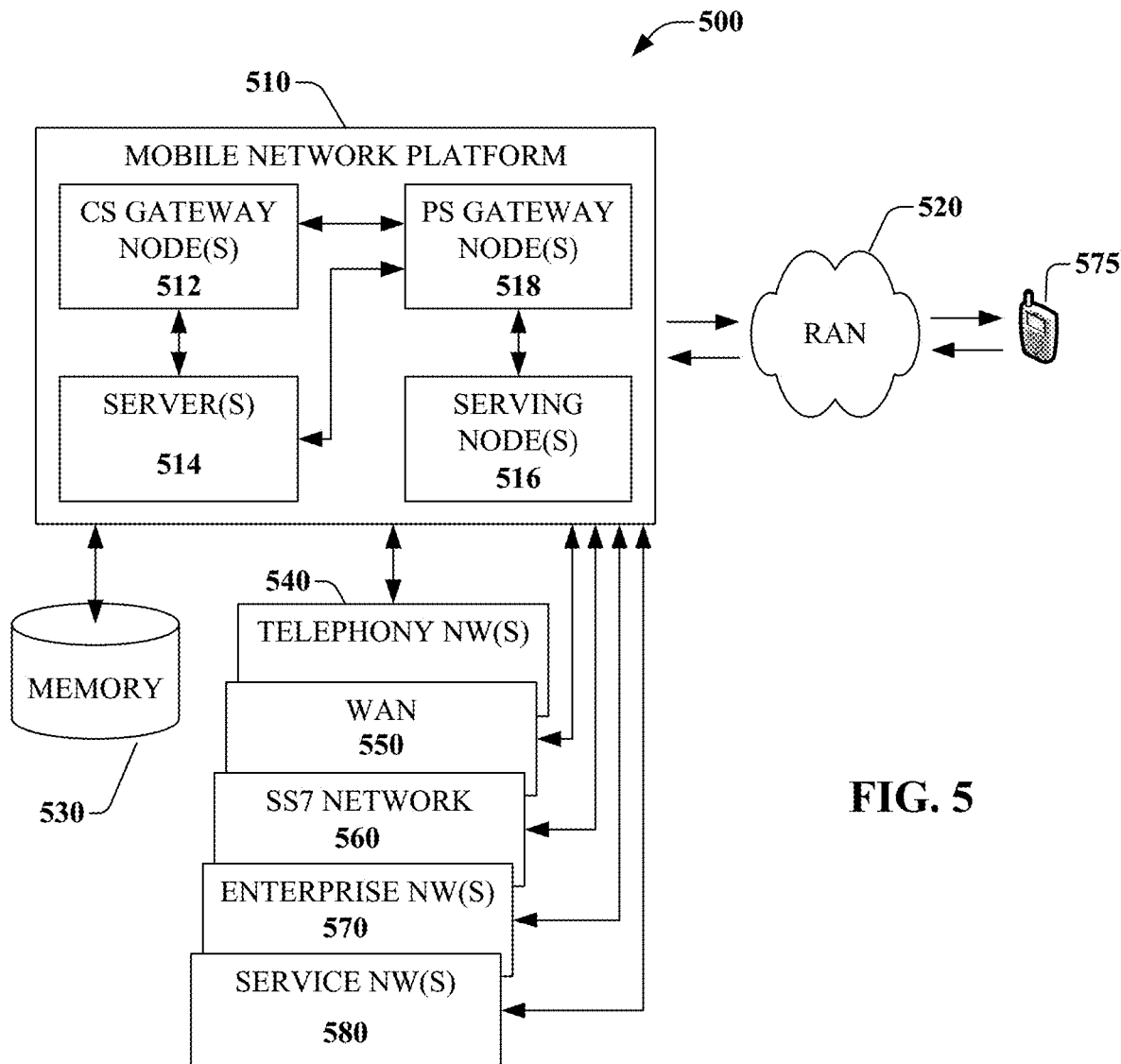
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. System 200 in FIG. 2A and the systems in FIGS. 2H-2M can be located in mobile network platform 510 and implement method 260 as described herein.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
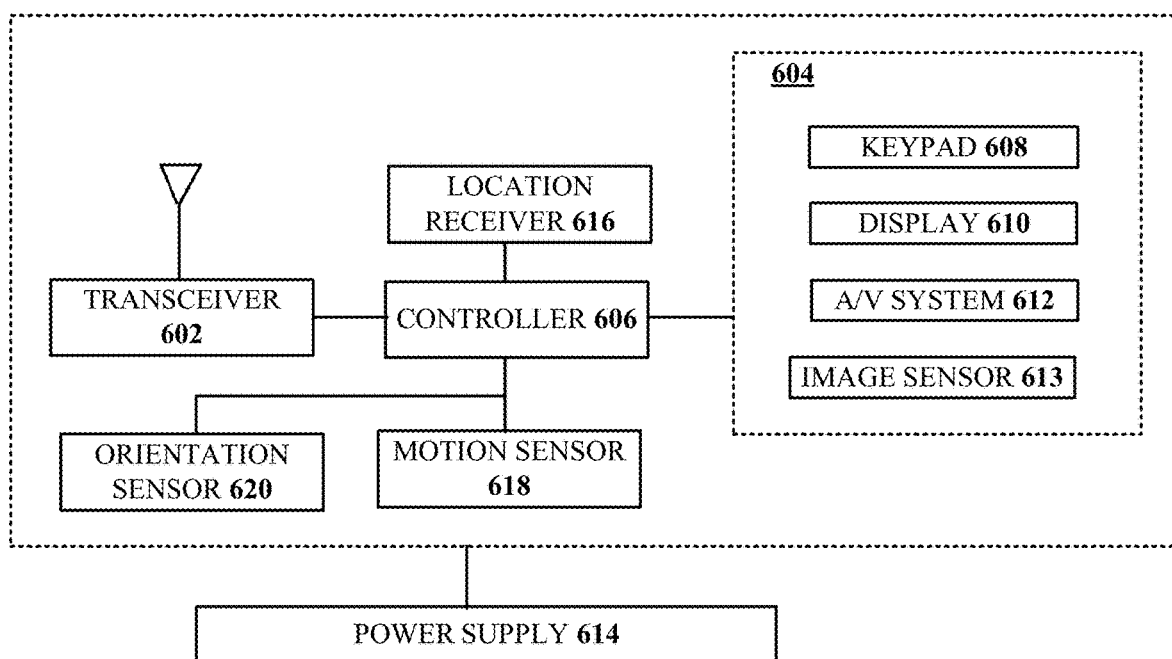
FIG. 6 is a block diagram of an example, non-limiting embodiment of a communication device in accordance with various aspects described herein.

Turning now to FIG. 6, an illustrative embodiment of a communication device 600 is shown. The communication device 600 can comprise the nodes and devices in system 200 in FIG. 2A and the systems in FIGS. 2H-2M as described herein.

The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    iteratively providing, from a message handler of a processing system including a processor, a first message to each of a group of node processors of the processing system resulting in a group of first messages, wherein each of the group of node processors represents a node of a group of nodes, wherein the iteratively providing of the group of first messages comprises:
        determining, by the message handler, a cost associated with a path of each first message resulting in a first group of costs and a first group of paths;
        identifying, by the message handler, a known minimum solution (KMS), wherein the KMS is a least cost from the first group of costs;
        selecting, by the message handler, at least one path from the first group of paths associated with the KMS resulting in at least one first selected path;
        providing, by the message handler, a next message that includes the at least one first selected path and based on the KMS to a first portion of the group of node processors of the processing system resulting in a first group of next messages and a first plurality of selected paths; and
    responsive to the iteratively providing of the group of first messages and first group of next messages, determining, by the message handler, a first target path that is a remaining path of the first plurality of selected paths, wherein the remaining path is identified from the iteratively providing of the group of first messages and the first group of next messages, and wherein the first target path is through each node of the group of nodes.

2. The method of claim 1, comprising determining, by the message handler, an average cost between any two nodes of the group of nodes, and determining, by the message handler, a standard deviation associated with the average cost.

3. The method of claim 2, wherein the selecting of the at least one path from the first group of paths comprises selecting, by the message handler, the at least one path from the first group of paths according to the average cost and the standard deviation.

4. The method of claim 2, comprising identifying, by the message handler, a first portion of the first group of paths such that each of the first portion of the first group of paths is associated with a first cost that is more than the average cost and the standard deviation associated with the average cost resulting a group of sequestered selected paths and a first identification.

5. The method of claim 4, comprising providing, by the message handler, the first identification of group of sequestered paths to a sequestration handler, wherein the processing system comprises the sequestration handler.

6. The method of claim 5, comprising:
    iteratively providing, from the sequestration handler, a second message to each of a second portion of a group of node processors of the processing system resulting in a group of second messages, wherein the iteratively providing of the group of second messages comprises:
        determining, by the sequestration handler, a cost associated with a path of each second message resulting in a second group of costs and a second group of paths;
        identifying, by the sequestration handler, the known minimum solution (KMS), wherein the KMS is a least cost from the second group of costs;
        selecting, by the sequestration handler, at least one path from the second group of paths associated with the KMS resulting in at least one second selected path;
        providing, by the sequestration handler, a next message that includes the at least one second selected path and based on the KMS to a third portion of the group of node processors of the processing system resulting in a second group of next messages and a second plurality of selected paths; and
    responsive to the iteratively providing of the group of second messages and second group of next messages, determining, by the sequestration handler, a second target path that is a remaining path of the second plurality of selected paths, wherein the remaining path is identified from the iteratively providing of the group of first messages and the second group of next messages, and wherein the second target path is through each node of the group of nodes.

7. The method of claim 6, wherein a cost associated with the second target path is lower than a cost associated with the first target path.

8. The method of claim 7, wherein the second target path is a complete path.

9. The method of claim 7, wherein the second target path is a complete shortest path.

10. The method of claim 1, wherein the first target path is a complete path.

11. The method of claim 1, wherein the first target path is a complete shortest path.

12. The method of claim 1, wherein the cost is one of time, distance, monetary cost, available bandwidth, latency, throughput, risk, or probability of success.

13. A device, comprising:
    a processing system including a processor, a group of node processors, an administration processor, and a message handler, wherein each of the group of node processors represents a node of a group of nodes; and a memory that stores executable instructions that, when executed by the processing system, facilitates performance of operations, the operations comprising:

determining, by the message handler, an average cost between any two nodes of the group of nodes, and determining, by the message handler, a standard deviation associated with the average cost;

iteratively providing from the message handler of the processing system, a first message to each of the group of node processors resulting in a group of first messages, wherein the iteratively providing of the group of first messages comprises:

determining, by the message handler, a cost associated with a path of each first message resulting in a first group of costs and a first group of paths;

identifying, by the message handler, a known minimum solution (KMS), wherein the KMS is a least cost from the first group of costs;

selecting, by the message handler, at least one path from the first group of paths associated with the KMS according to the average cost and the standard deviation resulting in at least one first selected path;

providing, by the message handler, a next message that includes the at least one first selected path and based on the KMS, the average cost, and the standard deviation to a first portion of the group of node processors of the processing system resulting in a first group of next messages and a first plurality of selected paths; and responsive to the iteratively providing of the group of first messages and the first group of next messages, determining, by the message handler, a first target path that is a remaining path of the first plurality of selected paths, wherein the remaining path is identified from the iteratively providing of the group of first messages and the first group of next messages, and wherein the first target path is through each node of the group of nodes.

14. The device of claim 13, wherein the operations comprise identifying, by the message handler, a first portion of the group of paths such that each of the first portion of the group of paths is associated with a first cost that is more than the average cost and the standard deviation associated with the average cost resulting a group of sequestered selected paths and a first identification.

15. The device of claim 14, wherein the operations comprise providing, by the message handler, the first identification of group of sequestered paths to a sequestration handler, wherein the processing system comprises the sequestration handler.

16. The device of claim 15, wherein the operations comprise:

iteratively providing, from the sequestration handler, a second message to each of a second portion group of node processors of the processing system resulting in a group of second messages, wherein the iteratively providing of the group of second messages comprises:

determining, by the sequestration handler, a cost associated with a path of each second message resulting in a second group of costs and a second group of paths;

identifying, by the sequestration handler, the known minimum solution (KMS), wherein the KMS is a least cost from the second group of costs;

selecting, by the sequestration handler, at least one path from the second group of paths associated with the KMS resulting in at least one second selected path;

providing, by the sequestration handler, a next message that includes the at least one second selected path and based on the KMS to a third portion of the group of node processors of the processing system resulting in a second group of next messages and a second plurality of selected paths; and responsive to the iteratively providing of the group of second messages and second group of next messages, determining, by the sequestration handler, a second target path that is a remaining path of the second plurality of selected paths, wherein the remaining path is identified from the iteratively providing of the group of first messages and the second group of next messages, and wherein the second target path is through each node of the group of nodes.

17. The device of claim 16, wherein a cost associated with the second target path is lower than a cost associated with the first target path.

18. A non-transitory, machine-readable medium, comprising executable instructions that, when executed by a processing system including a processor, a group of node processors, an administration processor, and a message handler, wherein each of the group of node processors represents a node of a group of nodes, facilitate performance of operations, the operations comprising:

determining, by the message handler, an average cost between any two nodes of the group of nodes, and determining, by the message handler, a standard deviation associated with the average cost;

iteratively providing from the message handler of the processing system, a first message to each of the group of node processors resulting in a group of first messages, wherein the iteratively providing of the group of first messages comprises:

determining, by the message handler, a cost associated with a path of each first message resulting in a group of costs and a group of paths;

identifying, by the message handler, a known minimum solution (KMS), wherein the KMS is a least cost from the group of costs;

selecting, by the message handler, at least one path from the group of paths associated with the KMS according to the average cost and the standard deviation resulting in at least one selected path;

providing, by the message handler, a next message that includes the at least one selected path and based on the KMS, the average cost, and the standard deviation to a portion of the group of node processors of the processing system resulting in a group of next messages and a plurality of selected paths; and responsive to the iteratively providing of the group of first messages and the group of next messages, determining, by the message handler, a target path that is a remaining path of the plurality of selected paths, wherein the remaining path is identified from the iteratively providing of the group of first messages and the group of next messages, and wherein the target path is through each node of the group of nodes.

19. The non-transitory, machine-readable medium of claim 18, wherein the target path is a complete path.

20. The non-transitory, machine-readable medium of claim 18, wherein the target path is a complete shortest path.

* * * * *